United States Patent
Schmitt et al.

(10) Patent No.: US 10,567,919 B2
(45) Date of Patent: Feb. 18, 2020

(54) DETECTING DEVICE MOVEMENT AND/OR DEVICE USAGE WITHIN A VEHICLE

(71) Applicant: Allstate Insurance Company, Northbrook, IL (US)

(72) Inventors: Kyle Patrick Schmitt, Chicago, IL (US); Pratheek M. Harish, Chicago, IL (US); Venu Madhav Tammali, Chicago, IL (US); Jared S. Snyder, Chicago, IL (US); Dana Ferguson, Chicago, IL (US)

(73) Assignee: Arity International Limited, Belfast (IE)

( * ) Notice: Subject to any disclaimer, the term of this patent is extended or adjusted under 35 U.S.C. 154(b) by 136 days.

(21) Appl. No.: 15/935,161

(22) Filed: Mar. 26, 2018

(65) Prior Publication Data
US 2018/0213360 A1    Jul. 26, 2018

Related U.S. Application Data

(63) Continuation-in-part of application No. 15/841,867, filed on Dec. 14, 2017, now Pat. No. 10,397,744, (Continued)

(51) Int. Cl.
  *H04W 4/02* (2018.01)
  *H04M 1/725* (2006.01)
  (Continued)

(52) U.S. Cl.
  CPC .......... *H04W 4/027* (2013.01); *G01C 21/165* (2013.01); *G01C 21/18* (2013.01); *G06Q 40/08* (2013.01);
  (Continued)

(58) Field of Classification Search
  CPC ....... H04W 4/027; H04W 4/026; G06F 17/16; G06F 17/18; G06Q 40/08
  See application file for complete search history.

(56) References Cited

U.S. PATENT DOCUMENTS 8,862,486 B2   10/2014   Cordova et al.
9,127,946 B1 *  9/2015   Menon ................... G06Q 40/08
(Continued)

FOREIGN PATENT DOCUMENTS

WO   2014058999 A1   4/2014
WO   2015187794 A1   12/2015

OTHER PUBLICATIONS

Chu, Hon Lung, "In-Vehicle Driver Detection Using Mobile Phone Sensors", Duke Electrical and Computer Engineering, published Apr. 20, 2011.
(Continued)

*Primary Examiner* — Kashif Siddiqui
(74) *Attorney, Agent, or Firm* — Banner & Witcoff, Ltd.

(57) ABSTRACT

Systems and methods are disclosed for receiving and transmitting accelerometer data and/or usage data, and analyzing the data to detect movement or usage of the device within a vehicle. A device, such as a mobile device, may detect a device movement event or a device usage event associated with the device. Based on the detection of the device movement event or the device usage event, a time associated with the event may be stored. The device may determine whether another event associated with the device occurs within a threshold amount of time from the time associated with the event. Based on a determination of whether the other event occurs within the threshold amount of time, the device may determine an event session associated with the device. The event session may comprise an instantaneous
(Continued)

event or a continuous event. Data indicative of the event session may be transmitted to a server.

20 Claims, 10 Drawing Sheets

Related U.S. Application Data which is a continuation of application No. 15/470,263, filed on Mar. 27, 2017, now Pat. No. 9,867,015, which is a continuation of application No. 15/263,562, filed on Sep. 13, 2016, now Pat. No. 9,654,932.

(51) Int. Cl.
*G01C 21/18* (2006.01)
*G01C 21/16* (2006.01)
*G06Q 40/08* (2012.01)

(52) U.S. Cl.
CPC ....... *H04M 1/72577* (2013.01); *H04W 4/026* (2013.01); *H04M 2250/10* (2013.01)

(56) References Cited

U.S. PATENT DOCUMENTS

| | | |
|---|---|---|
| 9,654,932 B1 | 5/2017 | Mukhtar et al. |
| 9,867,015 B1 * | 1/2018 | Mukhtar ............ G01C 21/165 |
| 2014/0180731 A1 | 6/2014 | Cordova et al. |
| 2014/0266789 A1 | 9/2014 | Matus |
| 2014/0278206 A1 * | 9/2014 | Girod .................... G01C 15/00 702/141 |
| 2015/0019266 A1 * | 1/2015 | Stempora ............... G06Q 40/08 705/4 |
| 2015/0120132 A1 | 4/2015 | Kramer et al. |
| 2016/0012486 A1 | 1/2016 | Vartanian et al. |
| 2016/0016590 A1 | 1/2016 | Fernandez Pozo et al. |
| 2016/0036964 A1 | 2/2016 | Barfield, Jr. et al. |
| 2016/0098868 A1 | 4/2016 | Lambert et al. |

OTHER PUBLICATIONS

Reininger, Michael et al., "A First Look At Vehicle Data Collection Via Smartphone Sensors", Sensors Applications Symposium (SAS), 2015 IEEE, Apr. 13, 2015, pp. 1-6.

Wang, Yan et al., "Sensing Vehicle Dynamics for Determining Driver Phone Use", MobiSys'13, Jun. 25-28, 2013, Taipei, Taiwan, copyright 2013.

Sep. 13, 2017—Intl Search Report and Written Opinion—App PCT/US17/051304.

"Gravity—GCMotion" https://developer.apple.com/documentation/gamecontroller/gcmotion/1405176-gravity website visited on Mar. 23, 2018, 1 page.

"UserAcceleration—CMDeviceMotion" https://developer.apple.com/documentation/coremotion/cmdevicemotion/1616149-useracceleration website visited Mar. 23, 2018, 1 page.

* cited by examiner

DETECTING DEVICE MOVEMENT AND/OR DEVICE USAGE WITHIN A VEHICLE

CROSS-REFERENCE TO RELATED APPLICATIONS

The present application is a continuation-in-part of pending U.S. patent application Ser. No. 15/841,867, filed Dec. 14, 2017 and entitled "System and Methods for Detecting Mobile Device Movement Within a Vehicle Using Accelerometer Data," which is a continuation of U.S. patent application Ser. No. 15/470,263, filed Mar. 27, 2017 and entitled "System and Methods for Detecting Mobile Device Movement Within a Vehicle Using Accelerometer Data" (now U.S. Pat. No. 9,867,015, issued on Jan. 9, 2018), which is a continuation of U.S. patent application Ser. No. 15/263,562, filed Sep. 13, 2016 and entitled "System and Methods for Detecting Mobile Device Movement Within a Vehicle Using Accelerometer Data" (now U.S. Pat. No. 9,654,932, issued on May 16, 2017). Each of the prior applications is incorporated herein by reference in its entirety.

TECHNICAL FIELD

Aspects of the disclosure generally relate to the analysis of accelerometer data and/or device usage data obtained from a device within a vehicle. In particular, various aspects of the disclosure relate to receiving and transmitting accelerometer data and usage data, and analyzing the data to detect movement or usage of the device within the vehicle.

BACKGROUND

Insurance providers value the safety of drivers and the general public. Detecting likely movement of a mobile device within a vehicle and providing feedback to the drivers reduces distracted driving and promotes safety. Although techniques exist to generally capture data from sensors on smartphones and in vehicles, they might not provide accurate and power-efficient methods of detecting movement of a mobile device. Further, these techniques may not calculate a risk score based on the movement of a mobile device, or provide feedback on improving the risk score.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, and computing devices, such as a device (e.g., a mobile device) comprising, for example, an accelerometer configured to measure acceleration of at least one axis of the accelerometer, a processor, and/or memory. The memory may store computer-executable instructions that, when executed by the processor, cause the processor of the mobile device to receive, from the accelerometer, acceleration data measured by the accelerometer. Based on the acceleration data measured by the accelerometer, a mobile device movement event associated with the mobile device may be detected. Based on detection of the mobile device movement event, a time associated with the mobile device movement event may be stored. The mobile device may determine whether an event associated with the mobile device occurs within a threshold amount of time from the time associated with the mobile device movement event. Based on a determination of whether the event associated with the mobile device occurs within the threshold amount of time from the time associated with the mobile device movement event, the mobile device may determine an event session associated with the mobile device. A start time of the event session may comprise the time associated with the mobile device movement event. The mobile device may transmit, to a server, data indicative of the event session.

In some aspects, receiving the acceleration data may comprise receiving first acceleration data measured by the accelerometer at a first time and second acceleration data measured by the accelerometer at a second time. Detecting the mobile device movement event may comprise determining a difference in angle between a first three-dimensional vector corresponding to the first acceleration data and a second three-dimensional vector corresponding to the second acceleration data. Detecting the mobile device movement event may also comprise determining that the difference in angle is greater than a threshold angle.

In some aspects, the mobile device may determine that the event associated with the mobile device occurs within the threshold amount of time from the time associated with the mobile device movement event. Determining the event session associated with the mobile device may comprise determining a continuous event session associated with the mobile device. An end time of the continuous event session may comprise a time associated with the event or a time associated with a different event occurring after the event.

In some aspects, the event associated with the mobile device may comprise a second mobile device movement event associated with the mobile device. The mobile device may determine that the second mobile device movement event associated with the mobile device occurs within the threshold amount of time from the time associated with the mobile device movement event.

In some aspects, the event associated with the mobile device may comprise a mobile device usage event associated with the mobile device. The mobile device may determine that the mobile device usage event associated with the mobile device occurs within the threshold amount of time from the time associated with the mobile device movement event. The mobile device usage event may comprise, for example, a mobile device unlock or a mobile device lock.

In some aspects, determining whether the event associated with the mobile device occurs within the threshold amount of time may comprise determining that each event, of a plurality of events associated with the mobile device, occurs within a respective threshold amount of time from a prior event. Determining the event session associated with the mobile device may comprise determining a continuous event session associated with the mobile device. An end time of the continuous event session may comprise a time associated with a last event of the plurality of events.

In some aspects, determining the event session associated with the mobile device may comprise determining the start time of the event session, an end time of the event session, and/or a duration of the event session. Transmitting the data indicative of the event session may comprise transmitting data indicative of the start time of the event session, the end time of the event session, and/or the duration of the event session.

Aspects of the disclosure relate to systems, methods, and computing devices, such as a mobile device that may detect a mobile device usage event associated with the mobile device. Based on the detection of the mobile device usage event, a time associated with the mobile device usage event may be stored. The mobile device may determine whether an event associated with the mobile device occurs within a threshold amount of time from the time associated with the mobile device usage event. Based on a determination of whether the event associated with the mobile device occurs within the threshold amount of time from the time associated with the mobile device usage event, an event session associated with the mobile device may be determined. A start time of the event session may comprise the time associated with the mobile device usage event. The mobile device may transmit, to a server, data indicative of the event session.

In some aspects, the mobile device may receive, from an accelerometer configured to measure acceleration of at least one axis of the accelerometer, first acceleration data measured by the accelerometer at a first time and/or second acceleration data measured by the accelerometer at a second time. The mobile device may determine a difference in angle between a first three-dimensional vector corresponding to the first acceleration data and a second three-dimensional vector corresponding to the second acceleration data. The mobile device may determine that the difference in angle is greater than a threshold angle. Determining whether the event associated with the mobile device occurs within the threshold amount of time from the time associated with the mobile device usage event may comprise determining, based on a determination that the difference in angle is greater than the threshold angle, that a mobile device movement event associated with the mobile device occurs within the threshold amount of time from the time associated with the mobile device usage event.

In some aspects, the event associated with the mobile device may comprise a mobile device movement event associated with the mobile device. The mobile device may determine that the mobile device movement event associated with the mobile device occurs within the threshold amount of time from the time associated with the mobile device usage event.

In some aspects, the event associated with the mobile device may comprise a second mobile device usage event associated with the mobile device. The mobile device may determine that the second mobile device usage event associated with the mobile device occurs within the threshold amount of time from the time associated with the mobile device usage event.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a specially-programmed computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
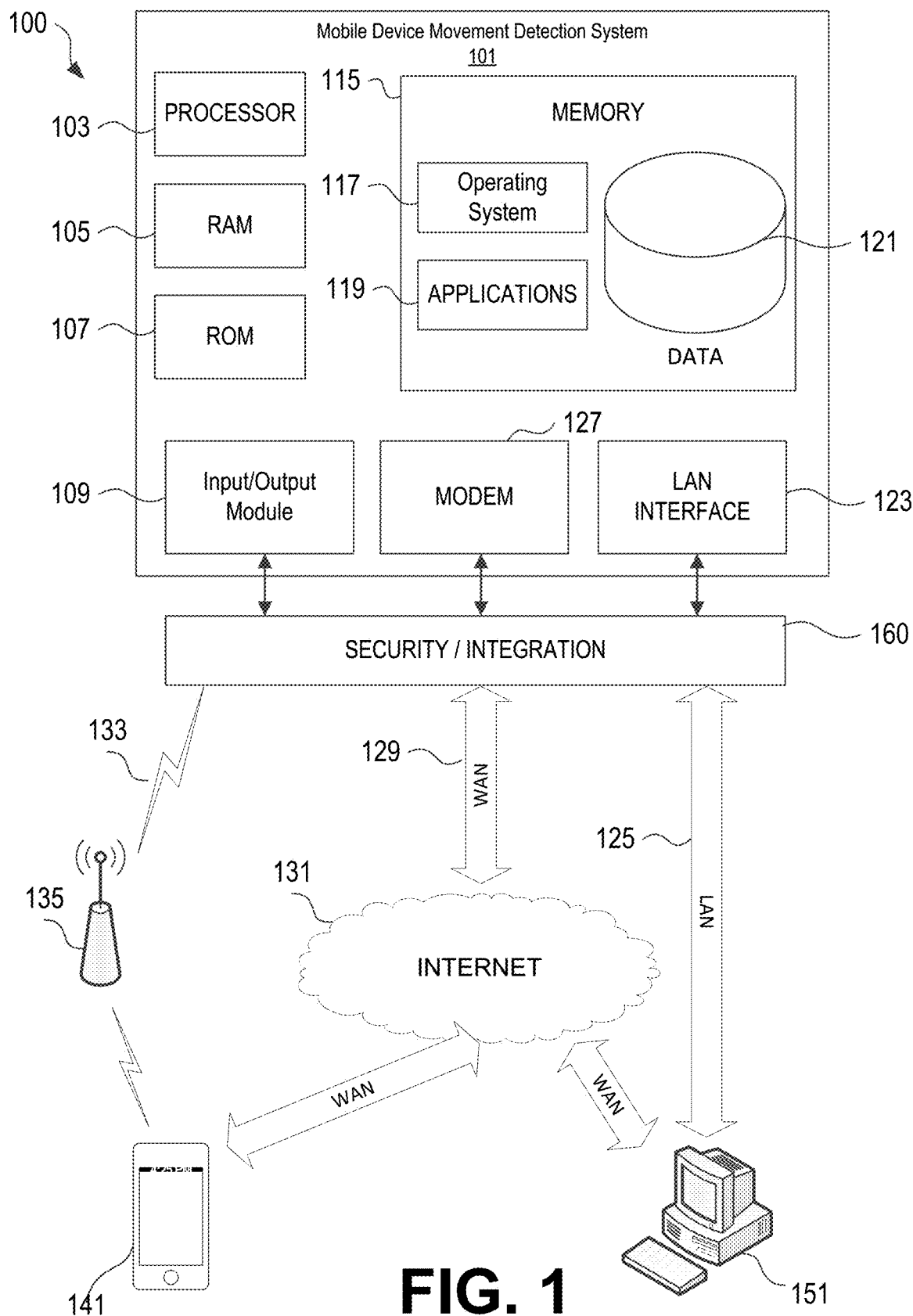
FIG. 1 illustrates a network environment and computing systems that may be used to implement aspects of the disclosure.

FIG. 1 illustrates a block diagram of a mobile device movement detection system 101 in a distracted driving analysis system 100 that may be used according to one or more illustrative embodiments of the disclosure. The mobile device movement detection system 101 may have a processor 103 for controlling overall operation of the mobile device movement detection system 101 and its associated components, including RAM 105, ROM 107, input/output module 109, and memory 115. The mobile device movement detection system 101, along with one or more additional devices (e.g., terminals 141, 151) may correspond to one or more special-purpose computing devices, such as distracted driving analysis computing devices or systems, including mobile computing devices (e.g., smartphones, smart terminals, tablets, and the like) and vehicular-based computing devices, configured as described herein for collecting and analyzing sensor data from mobile devices associated with vehicles, detecting mobile device movement events, determining a risk score, and providing feedback regarding the risk score.

Input/Output (I/O) 109 may include a microphone, keypad, touch screen, and/or stylus through which a user of the mobile device movement detection system 101 may provide input, and may also include one or more of a speaker for providing audio output and a video display device for providing textual, audiovisual and/or graphical output. Software may be stored within memory 115 and/or storage to provide instructions to processor 103 for enabling the mobile device movement detection system 101 to perform various functions. For example, memory 115 may store software used by the mobile device movement detection system 101, such as an operating system 117, application programs 119, and an associated internal database 121. Processor 103 and its associated components may allow the mobile device movement detection system 101 to execute a series of computer-readable instructions to collect and analyze sensor data, detect mobile device movement events, determine risk scores, and provide feedback regarding risk scores.

The mobile device movement detection system 101 may operate in a networked environment supporting connections to one or more remote computers, such as terminals/devices 141 and 151. The mobile device movement detection system 101, and related terminals/devices 141 and 151, may be in signal communication with special-purpose devices installed in vehicles, mobile devices that may travel within vehicles, or devices outside of vehicles that are configured to receive and process sensor data. Thus, the mobile device movement detection system 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the mobile device movement detection system 101.

The network connections depicted in FIG. 1 include a local area network (LAN) 125 and a wide area network (WAN) 129, and a wireless telecommunications network 133, but may also include other networks. When used in a LAN networking environment, the mobile device movement detection system 101 may be connected to the LAN 125 through a network interface or adapter 123. When used in a WAN networking environment, the mobile device movement detection system 101 may include a modem 127 or other means for establishing communications over the WAN 129, such as network 131 (e.g., the Internet). When used in a wireless telecommunications network 133, the mobile device movement detection system 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Also illustrated in FIG. 1 is a security and integration layer 160, through which communications may be sent and managed between the mobile device movement detection system 101 (e.g., a user's personal mobile device, a vehicle-based system, external server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the mobile device movement detection system 101. As an example, a security and integration layer 160 of a mobile computing device, vehicle-based device, or a server operated by an insurance provider, financial institution, governmental entity, or other organization, may comprise a set of web application servers configured to use secure protocols and to insulate the mobile device movement detection system 101 from external devices 141 and 151. In some cases, the security and integration layer 160 may correspond to a set of dedicated hardware and/or software operating at the same physical location and under the control of same entities as the mobile device movement detection system 101. For example, layer 160 may correspond to one or more dedicated web servers and network hardware in an organizational datacenter or in a cloud infrastructure supporting a cloud-based mobile device location and configuration system. In other examples, the security and integration layer 160 may correspond to separate hardware and software components which may be operated at a separate physical location and/or by a separate entity.

As discussed below, the data transferred to and from various devices in distracted driving analysis system 100 may include secure and sensitive data, such as driving data, driving locations, vehicle data, and confidential individual data such as insurance data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored in a database or other storage in a mobile device, analysis server, or other computing devices in the distracted driving analysis system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the distracted driving analysis system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption.

In other examples, one or more web services may be implemented within the mobile device movement detection system 101 in the distracted driving analysis system 100 and/or the security and integration layer 160. The web services may be accessed by authorized external devices and users to support input, extraction, and manipulation of the data (e.g., driving data, location data, confidential personal data, etc.) between the mobile device movement detection system 101 in the distracted driving analysis system 100. Web services built to support the distracted driving analysis system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers (e.g., mobile device movement detection devices 101) and various clients 141 and 151 (e.g., mobile devices, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in the distracted driving analysis system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving and analyzing sensor data, such as faster response times and less dependence on network conditions when transmitting/receiving sensor data, vehicle data, occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the mobile device movement detection system 101 within the distracted driving analysis system 100 (e.g., mobile device movement detection software applications, and the like), including computer executable instructions for receiving and storing data from sensors of mobile devices, and/or vehicle-based systems, analyzing the sensor data to determine whether there is a mobile device movement event, calculating a risk score based on aggregated sensor data, providing feedback regarding the risk score, and/or performing other related functions as described herein.

Figure 2:
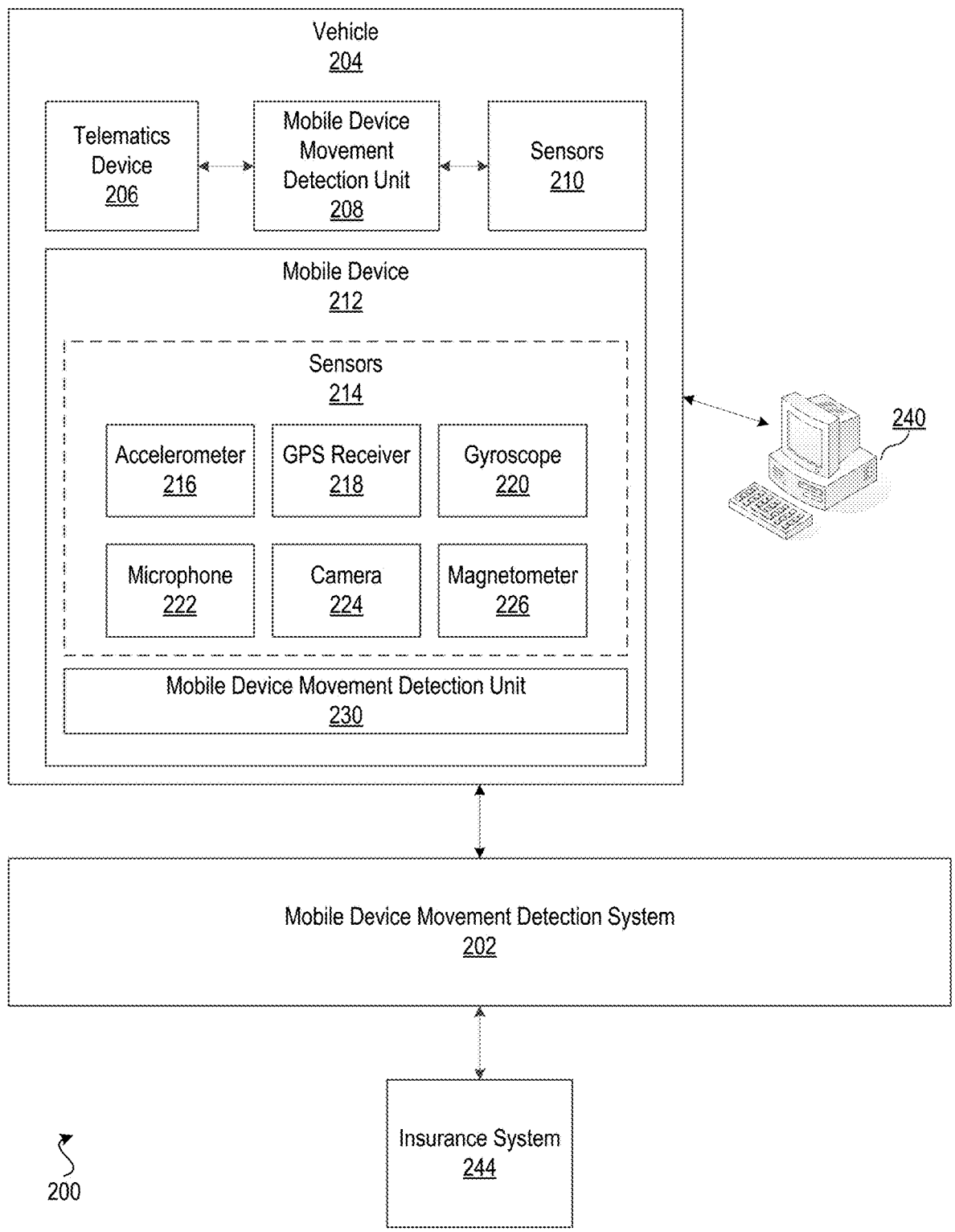
FIG. 2 is a block diagram illustrating various components and devices associated with an example distracted driving analysis system, according to one or more aspects of the disclosure.

FIG. 2 is an illustration of an example implementation of a distracted driving analysis system 200. The distracted driving analysis system 200 may be similar to and/or may include some or all of the components of the distracted driving analysis system 100 in FIG. 1. The system 200, in this example, includes a mobile device movement detection system 202. The mobile device movement detection system 202, described in further detail below, detects movement events relating to a mobile device associated with a vehicle. The mobile device movement detection system 202 may be similar to and/or may include some or all of the components of the mobile device movement detection system 101 in FIG. 1. In some examples, the mobile device movement detection system 202 may detect a mobile device movement event based on sensor data received from one or more mobile devices associated with the vehicle.

The example distracted driving analysis system 200 may contain some or all of the hardware/software components as the distracted driving analysis system 100 depicted in FIG. 1. The mobile device movement detection system 202 is a special-purpose computing device that is configured to receive sensor data from a mobile device 212 located within a vehicle 204. The mobile device movement detection system 202 may initiate communication with, retrieve data from, or receive sensor data (e.g., signals) from one or more sensors within a mobile device 212 wirelessly over one or more computer networks (e.g., the Internet), where the mobile device 212 is located within a vehicle 204. The mobile device movement detection system 202 may also be configured to receive driving data from a vehicle 204 wirelessly via telematics device 206, or by way of separate computing systems (e.g., computer 240) over one or more computer networks (e.g., the Internet). Further, the mobile device movement detection system 202 may be configured to receive driving vehicle-related data from one or more third-party telematics systems or non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

A mobile device 212 in the distracted driving analysis system 200 may be, for example, any mobile device, such as a smartphone, tablet computing device, personal digital assistant (PDA), smart watch, netbook, laptop computer, and other like devices found within a vehicle 204. As used herein, a mobile device 212 "within" the vehicle 204 includes mobile devices that are inside of or otherwise secured to a vehicle, for instance, in the cabins of a vehicle.

The mobile device 212 includes a set of mobile device sensors 214, which may include, for example, an accelerometer 216, a GPS receiver 218, a gyroscope 220, a microphone 222, a camera 224, and a magnetometer 226. The mobile device sensors 214 may be capable of detecting and recording various conditions at the mobile device 112 and operational parameters of the mobile device 112. For example, sensors 214 may detect and store data corresponding to the mobile device's location (e.g., GPS coordinates), speed and direction in one or multiple axes (forward and back, left and right, and up and down for example), rate and direction of acceleration or deceleration, specific instances of sudden acceleration, deceleration, lateral movement, and other data which may be indicative of a mobile device movement event. Additional sensors 214 may include audio sensors, video sensors, signal strength sensors, communication network-presence sensors, ambient light sensors, temperature/humidity sensors, and/or barometer sensors, which may be used to, for example, listen to audio signals indicating a door locking/unlocking, door chime, or vehicle ignition, sensing light from an overhead or dashboard light, detecting a temperature or humidity change indicative of entering a vehicle, and/or detecting a presence of a network or communication device associated with a vehicle (e.g., a BLUETOOTH transceiver associated with a vehicle).

Software applications executing on mobile device 212 may be configured to detect certain driving data independently using mobile device sensors 214. For example, mobile device 212 may be equipped with sensors 214, such as an accelerometer 216, a GPS receiver 218, a gyroscope 220, a microphone 222, a camera 224, and/or a magnetometer 226, and may determine vehicle location, speed, acceleration/deceleration, direction and other basic driving data without needing to communicate with the vehicle sensors 210, or any vehicle system. In other examples, software on the mobile device 212 may be configured to receive some or all of the driving data collected by vehicle sensors 210.

Additional sensors 214 may detect and store external conditions. For example, audio sensors and proximity sensors 214 may detect other nearby mobile devices, traffic levels, road conditions, traffic obstructions, animals, cyclists, pedestrians, and other conditions that may factor into a braking event data analysis.

Data collected by the mobile device sensors 214 may be stored, processed, and/or analyzed within the mobile device 212, and/or may be transmitted to one or more external devices for processing, analysis, and the like. For example, as shown in FIG. 2, sensor data collected by the mobile device sensors 214 may be transmitted to a mobile device movement detection system 202. In some examples, the data collected by the mobile device sensors 214 may be stored, processed, and/or analyzed at the vehicle 204 by an on-board computing device in the vehicle or by the mobile device 212, and/or may be transmitted to one or more external devices (e.g., an insurance system 244). For example, sensor data may be exchanged (uni-directionally or bi-directionally) between vehicle 204 and mobile device 212.

Data may be transmitted between the mobile device 212 and the vehicle 204 via wireless networks, including those discussed above, or short-range communication systems. Short-range communication systems are data transmission systems configured to transmit and receive data between nearby devices. In this example, short-range communication systems may be used to transmit sensor data to other nearby mobile devices and/or vehicles, and to receive sensor data from other nearby mobile devices and/or vehicles. Short-range communication systems may be implemented using short-range wireless protocols such as WLAN communication protocols (e.g., IEEE 802.11), Bluetooth (e.g., IEEE 802.15.1), or one or more of the Communication Access for Land Mobiles (CALM) wireless communication protocols and air interfaces. The transmissions between the short-range communication systems may be sent via Bluetooth, satellite, GSM infrared, IEEE 802.11, WiMAX, RFID, and/or any suitable wireless communication media, standards, and protocols. In certain systems, short-range communication systems may include specialized hardware installed in vehicle 204 and/or mobile device 212 (e.g., transceivers, antennas, etc.), while in other examples the communication systems may be implemented using existing hardware components (e.g., radio and satellite equipment, navigation computers) or may be implemented by software running on the mobile device 212 and/or on an on-board computing device within the vehicle 204.

The vehicle 204 may be, for example, an automobile, motorcycle, scooter, bus, recreational vehicle, boat, bicycle, or other vehicle in which a mobile device may be located. The vehicle 204 may include one or more sensors 210, which are capable of detecting and recording various conditions at the vehicle and operating parameters of the vehicle. For example, the sensors 210 may detect, transmit, or store data corresponding to the vehicle's location (e.g., GPS coordinates), speed and direction, rate and direction of acceleration, deceleration, and/or may detect transmit specific instances of sudden acceleration, sudden deceleration, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems. Thus, in some examples, the mobile device movement detection system 202 may acquire information about the vehicle 204 directly from the vehicle 204.

Additional sensors 210 may detect and store the external driving conditions, for example, external temperature, rain, snow, light levels, and sun position for driver visibility. Additional sensors 210 may also detect and store data relating to compliance with traffic laws and the observance of traffic signals and signs. Additional sensors 210 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle 204 may also include cameras or proximity sensors 210 capable of recording additional conditions inside or outside of the vehicle 204. For example, internal cameras 210 may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). Sensors 210 also may be configured to collect data a driver's movements or the condition of a driver. For example, the vehicle 204 may include sensors 210 that monitor a driver's movements, such as the driver's eye position and/or head position, etc. Additional sensors 210 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Further, the vehicle 204 may include sensors 210 that are capable of detecting other nearby vehicles, traffic levels, road conditions, traffic obstructions, animals, cyclists, pedestrians, and other conditions that may factor into an analysis of vehicle telematics data. Certain vehicle sensors 210 also may collect information regarding the driver's route choice, whether the driver follows a given route, and to classify the type of trip (e.g., commute, errand, new route, etc.). A Global Positioning System (GPS), locational sensors positioned inside the vehicle 204, and/or locational sensors or devices external to the vehicle 204 may be used determine the route, trip type (e.g., commute, errand, new route, etc.), lane position, and other vehicle position or location data.

The data collected by the vehicle sensors 210 may be stored or analyzed within the respective vehicle 204 by an on-board computing device or mobile device 212, or may be transmitted to one or more external devices. For example, as shown in FIG. 2, sensor data may be transmitted to a mobile device movement detection system 202, which may be a collection of special-purpose computing devices that are interconnected and in signal communication with each other. The special-purpose computing devices may be programmed with a particular set of instructions that, when executed, perform functions associated with processing the sensor data to detect mobile device movement events, calculating a risk score, and generating and/or providing feedback to the mobile device or vehicle based on the calculated risk score. As such, a mobile device movement detection system 202 may be a separate special-purpose computing device or may be integrated into one or more components within the vehicle 204, such as the telematics device 206, or in the internal computing systems (e.g., on-board vehicle computing device) of the vehicle 204. Additionally, the sensor data may be transmitted as vehicle telematics data via a telematics device 206 to one or more remote computing devices, such as a mobile device movement detection system 202. A telematics device 206 may be a computing device containing many or all of the hardware/software components as the mobile device movement detection system 101 depicted in FIG. 1. As discussed above, the telematics device 206 may receive vehicle telematics data from vehicle sensors 210, and may transmit the data to one or more external computer systems (e.g., an insurance system 244) over a wireless network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 may also store the type of the vehicle 204, for example, the make, model, trim (or sub-model), year, and/or engine specifications, as well as other information such as vehicle owner or driver information, insurance information, and financing information for the vehicle 204.

In the example shown in FIG. 2, the telematics device 206 may receive vehicle telematics data from vehicle sensors 210, and may transmit the data to a mobile device movement detection system 202. However, in other examples, one or more of the vehicle sensors 210 may be configured to transmit data directly to a mobile device movement detection system 202 without using a telematics device 206. For instance, a telematics device 206 may be configured to receive and transmit data from certain vehicle sensors 210, while other sensors may be configured to directly transmit data to a mobile device movement detection system 202 without using the telematics device 206. Thus, telematics devices 206 may be optional in certain embodiments.

In certain embodiments, the mobile device 212 within the vehicle 204 may be programmed with instructions to collect vehicle telematics data from the telematics device 206 or from the vehicle sensors 210, and then to transmit the vehicle telematics data to the mobile device movement detection system 202 and other external computing devices. For example, the mobile device 212 may transmit the vehicle telematics data directly to a mobile device movement detection system 202, and thus may be used in conjunction with or instead of the telematics device 206. Moreover, the processing components of the mobile device 212 may be used to collect and analyze sensor data and/or vehicle telematics data to detect mobile device movement events, calculate a risk score, provide feedback to mobile device or vehicle based on the risk score, and perform other related functions. Therefore, in certain embodiments, the mobile device 212 may be used in conjunction with or instead of the mobile device movement detection unit 208.

The vehicle 204 may include a mobile device movement detection unit 208, which may be a separate computing device or may be integrated into one or more other components within the vehicle 204, such as the telematics device 206, the internal computing systems of the vehicle 204, and/or the mobile device 212. In some examples, the mobile device 212 may include a mobile device movement detection unit 230 which may be a device separate and independent from the mobile device movement detection unit 208 of the vehicle 204. The mobile device movement detection units 208 and 230 may alternatively be implemented by computing devices separate and independent from the vehicle 204 and the mobile device 212, such as one or more computer systems 240. In any of these examples, the mobile device movement detection units 208 and 230 may contain some or all of the hardware/software components as the mobile device movement detection system 101 depicted in FIG. 1.

The mobile device movement detection units 208 and 230 may be implemented in hardware and/or software configured to receive raw sensor data from the vehicle sensors 210 and the mobile device sensors 214 respectively, and/or other vehicle telematics data sources. The mobile device movement detection unit 208 may further be configured to receive sensor data from a telematics device 206. After receiving the sensor data and vehicle telematics data, the mobile device movement detection units 208 and 230 may process the sensor data and vehicle telematics data, and analyze the sensor data and vehicle telematics data to determine whether a mobile device movement event occurred at a particular time. One or more notifications including feedback may be generated based on a calculation of a risk score to the mobile device 212 or vehicle 204. For example, the mobile device movement detection units 208 and 230 may analyze the sensor data collected from the mobile sensors 214 and the vehicle sensors 210. The mobile device movement detection units 208 and 230 may determine whether there is a threshold change in the direction of acceleration of the mobile device 212. In examples where there is a threshold change in the direction of acceleration of the mobile device 212, the mobile device movement detection units 208 and 230 may determine that a mobile device movement event has occurred as a particular time. The mobile device movement detection units 208 and 230 may then aggregate sensor data and vehicle telematics data associated with a window of time encompassing the mobile device movement event, and calculate a risk score based on the aggregated data. The mobile device movement detection units 208 and 230 may then generate and provide feedback to the mobile device 212 or vehicle 204 based on the calculated risk score.

Further, in certain implementations, the functionality of the mobile device movement detection units 208 and 230, such as collecting and analyzing sensor data to detect mobile device movement events, aggregating sensor data and vehicle telematics data, calculating a risk score based on the aggregated data, and providing notifications to the driver or vehicle based on the calculated risk score, may be performed in a mobile device movement detection system 202 rather than by the individual vehicle 204 or mobile device 212. In such implementations, the vehicle 204 or mobile device 212 may only collect and transmit sensor data to a mobile device movement detection system 202, and thus the mobile device movement detection units 208 and 230 may be optional. Thus, in various examples, the analyses and actions performed within the mobile device movement detection units 208 and 230 may be performed entirely within the mobile device movement detection units 208 and 230, entirely within the mobile device movement detection system 202, or in some combination of the two. For instance, the mobile device movement detection units 208 and 230 may continuously receive and analyze sensor data and determine whether the sensor data indicates a change in the direction of acceleration/deceleration that is above a predefined threshold. While the changes in the direction of acceleration/deceleration are below the predefined threshold (i.e., there is minimal likelihood of a mobile device movement event), the mobile device movement detection units 208 and 230 may continue to receive and analyze data, such that large or repetitive amounts of data need not be transmitted to the mobile device movement detection system 202. However, upon detecting a change in the direction of acceleration/deceleration above the predefined threshold, the mobile device movement detection units 208 and 230 may transmit sensor data and vehicle telematics data associated with a window of time encompassing the mobile device movement event to the mobile device movement detection system 202, such that the mobile device movement detection system 202 may aggregate the sensor data and vehicle telematics data associated with the window of time to calculate a risk score for that window of time.

Additional arrangements, as well as detailed descriptions and examples of the analyses that may be performed by the mobile device movement detection units 208 and 230 and/or by the mobile device movement detection system 202 are described below.

Figure 3:
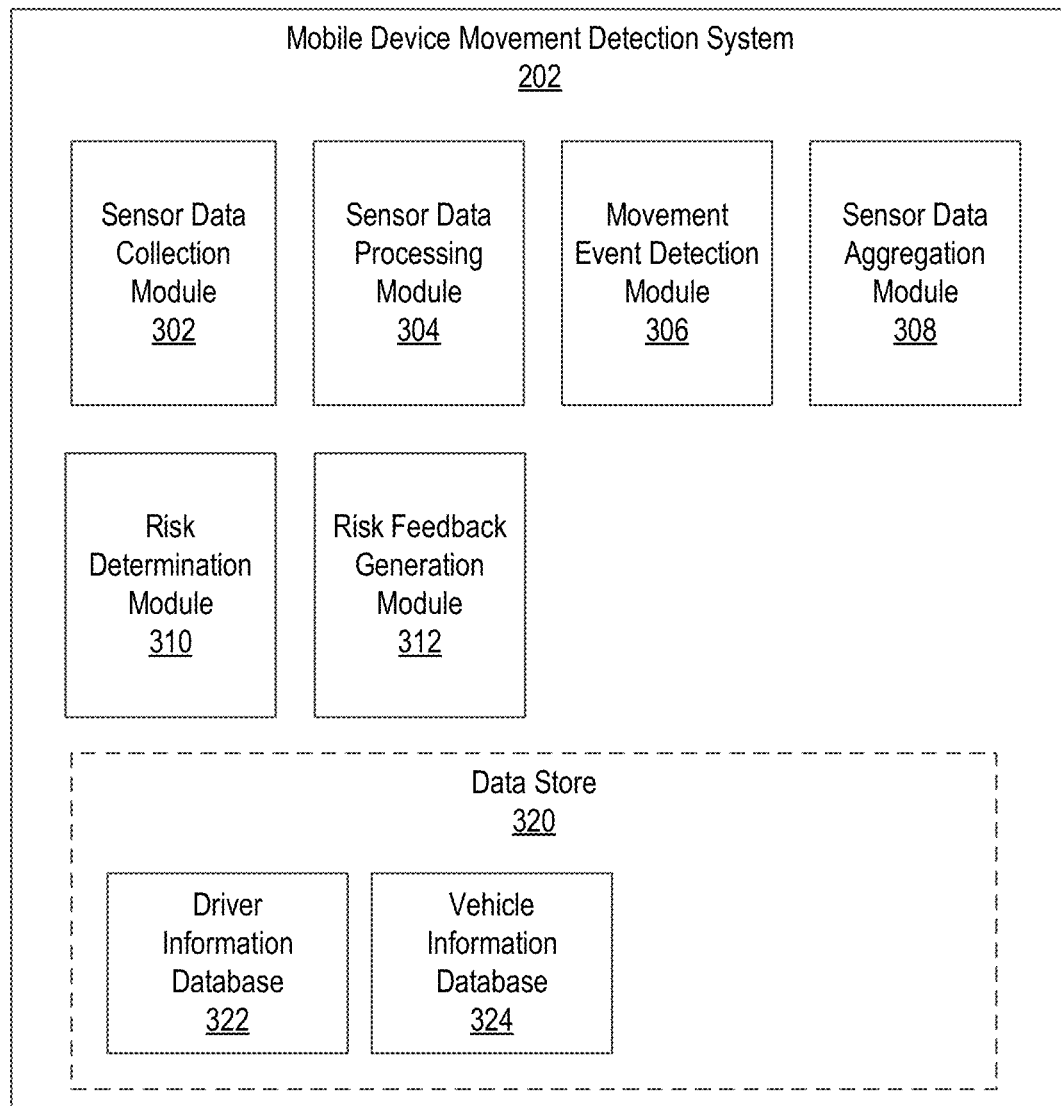
FIG. 3 is a block diagram of an example of an implementation of a mobile device movement detection system, according to one or more aspects of the disclosure.

FIG. 3 shows an example implementation of a mobile device movement detection system 202. In some example implementations, the mobile device movement detection system 202 is a special-purpose computing device programmed with instructions, that when executed, perform functions associated with collecting or receiving sensor data from mobile devices and vehicles, processing the sensor data, determining whether a mobile device movement event occurred at a particular time, aggregating sensor data over a window of time encompassing the mobile device movement event, calculating a risk score based on the aggregated sensor data, and generating and/or providing feedback to the mobile device or vehicle based on the calculated risk score. In these example implementations, the units 302-312 of the mobile device movement detection system 202 correspond to particular sets of instructions embodied as software programs residing at the mobile device movement detection system 202. In other example implementations, the mobile device movement detection system 202 is a collection of special-purpose computing devices that are interconnected and in signal communication with each other. In these examples, each unit or device 302-312 of the mobile device movement detection system 202 respectively corresponds to a special-purpose computing device programmed with a particular set of instructions, that, when executed, perform respective functions associated with collecting or receiving sensor data from mobile devices and vehicles, processing the sensor data, determining whether a mobile device movement event occurred at a particular time, aggregating sensor data over a window of time encompassing the mobile device movement event, calculating a risk score based on the aggregated sensor data, and generating and/or providing feedback to the mobile device or vehicle based on the calculated risk score. Such special-purpose computing devices may be, for example, application servers programmed to perform the particular set of functions.

The mobile device movement detection system 202, in this example, includes various modules, units and databases that facilitate collecting or receiving sensor data, processing the sensor data, determining whether a mobile device movement event occurred at a particular time, aggregating sensor data over a window of time encompassing the mobile device movement event, calculating a risk score based on the aggregated sensor data, and generating and/or providing feedback to the mobile device or vehicle based on the calculated risk score. It will be appreciated that the mobile device movement detection system 202 illustrated in FIG. 3 is shown by way of example, and that other implementations of a mobile device movement detection system may include additional or alternative modules, units, devices, and/or databases without departing from the scope of the claimed subject matter. In this example, the mobile device movement detection system 202 includes a sensor data collection module 302, a sensor data processing module 304, a movement event detection module 306, a sensor data aggregation module 308, a risk determination module 310, a risk feedback generation module 312, and a data store 320. Each module may include hardware and/or software configured to perform various functions within the mobile device movement detection system 202. Further, each module may be a separate and distinct computing device or one or more modules may be integrated into a single computing device.

The data store 320 may store information relating to the driver of the vehicle 204, information relating to the vehicle 204, and/or information relating to the mobile device 212. For example, the data store 320 may include a driver information database 322, and a vehicle information database 324. It will be appreciated that in other examples, the data store 320 may include additional and/or alternative databases.

The driver information database 322 may store information associated with drivers of the vehicles 204 (e.g., name of driver, contact information, one or more associated mobile devices, one or more associated vehicles, etc.). In some examples, the driver information database 322 may also store the driver's affiliation with one or more insurance providers.

The vehicle information database 324 may store information associated with the vehicles 204 (e.g., make, model, mileage, last maintenance date, accident reports, etc.).

Figure 4:
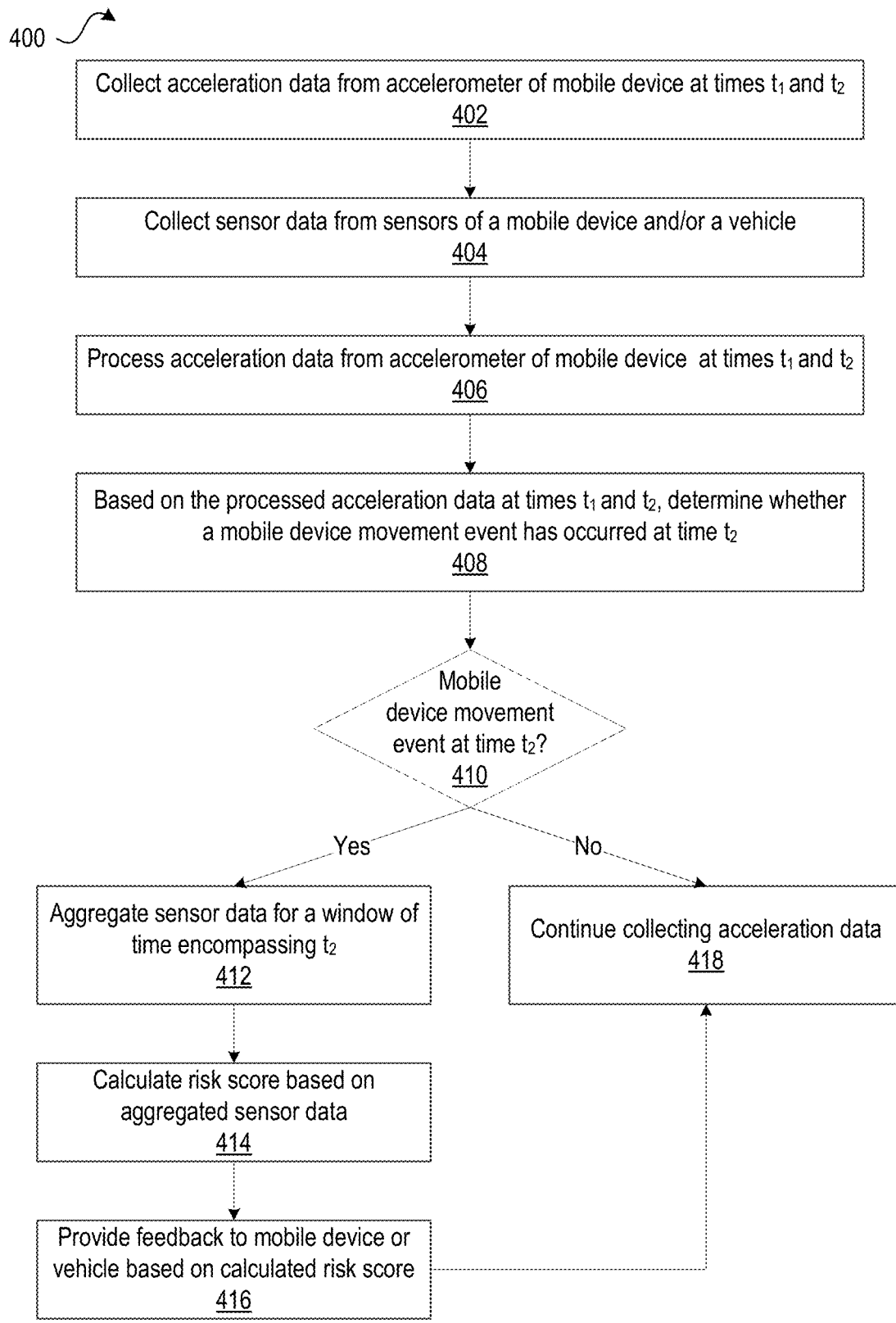
FIG. 4 is a flowchart of example method steps for receiving and processing sensor data from a mobile device, detecting a mobile device movement event, aggregating the sensor data from the mobile device, calculating a risk score based on the aggregated data, and providing feedback, according to one or more aspects of the disclosure.

FIG. 4 is a flowchart 400 of example steps for determining whether a mobile device movement event occurred at a particular time, calculating a risk score, and providing feedback based on the risk score according to one or more aspects described herein. The various components of the mobile device movement detection system 202 and/or the mobile device movement detection unit 230 of the mobile device 212 may be used to perform these method steps.

In step 402, the sensor data collection module 302 may receive acceleration data from the accelerometer 216 of the mobile device 212 at times $t_1$ and $t_2$. Times $t_1$ and $t_2$ may be separated by a predefined duration of time (e.g., one second, one millisecond, etc.), such that time $t_1$ precedes time $t_2$. The acceleration data (signal) at times $t_1$ and $t_2$ may be represented as three-dimensional vectors having a magnitude and a direction. In some examples, the acceleration data (signal) may include a gravity component and a non-gravity component, where the gravity component represents the acceleration due to gravity and where the non-gravity component represents the linear acceleration due to the movement of the mobile device 212.

In step 404, the sensor data collection module 302 may receive sensor data from the one or more sensors 214 installed at, attached to, and/or remotely located relative to the mobile device 212. In some examples, the mobile device 212 may collect sensor data from the one or more sensors 214 and transmit the sensor data to the mobile device movement detection system 202 in real-time or near real-time. As such, the mobile device 212 may broadcast the sensor data from the one or more sensors 214, transmit the sensor data to the mobile device movement detection unit 230 in real-time, and the mobile device movement detection unit 230 may transmit the sensor data to the mobile device movement detection system 202. The mobile device movement detection unit 230 may or may not transmit the sensor data to the mobile device movement detection system 202 in real-time. For instance, the mobile device movement detection unit 230 may begin to collect sensor data from the one or more sensors 214, and wait to transmit sensor data from the one or more sensors 214 until the mobile device movement detection unit 230 or mobile device movement detection system 202 detects a mobile device movement event (e.g., in step 410). In another example, the mobile device movement detection unit 230 may transmit sensor data to the mobile device movement detection system 202 in response to a request from the mobile device movement detection system 202 to collect and transmit sensor data associated with a window of time. As such, the mobile device movement detection unit 230 advantageously limits and/or controls the number of transmissions between the mobile device 212 and the mobile device movement detection system 202. Examples of sensor data collected in step 404 from the sensors 214 of the mobile device 212 may include acceleration from the accelerometer 216, location from the GPS receiver 218, rotational motion from the gyroscope 220, sound from the microphone 222, movement from the camera 224, and magnetization from the magnetometer 226. Further, as mentioned above, the sensor data may also include data received from sensors 210 of the vehicle 204, and/or data received from third-party sources (e.g., traffic data, weather data, etc.).

In certain embodiments, in addition to the sensor data obtained from the sensors 214 of the mobile device 212, the sensor data collection module 302 may collect and process sensor data from the sensors 210 of the vehicle 204. The sensor data from the sensors 210 of the vehicle 204 may be used to supplement the sensor data from the sensors 214 of the mobile device 212 as desired. The additional data may be beneficial in providing increased accuracy in vehicle telematics data. For example, where signal communication with the mobile device 212 is lost, the sensor data collection module 302 may collect and process sensor data from the sensors 210 of the vehicle 204.

In step 406, the sensor data processing module 304 may process the acceleration data (signal) received from the accelerometer 216 of the mobile device at times $t_1$ and $t_2$. In some examples, the sensor data processing module 304 may apply one or more algorithms to separate the acceleration due to gravity from linear acceleration due to the movement of the mobile device 212 at times $t_1$ and $t_2$. For instance, the sensor data processing module 304 may apply a low pass filter to the original acceleration data (signal) to isolate the acceleration due to gravity. The sensor data processing module 304 may then remove (e.g., subtract) the acceleration due to gravity from the original acceleration data (signal). Alternatively, in another example, the sensor data processing module 304 may apply a high pass filter to extract the linear acceleration from the original acceleration data (signal). As such, in these examples, the processed acceleration signal represents only the linear acceleration due to the movement of the mobile device 212.

In other examples, the sensor data processing module 304 may additionally or alternatively use a gravity sensor of the mobile device to determine the acceleration due to gravity. In these examples, the sensor data processing module 304 may then apply one or more algorithms to remove the acceleration from gravity from the original acceleration data (signal) to isolate the acceleration due to gravity.

In step 408, the movement event detection module 306 may determine whether a mobile device movement event occurred at time $t_2$ based on the processed acceleration data (signal) at times $t_1$ and $t_2$.

Figure 5:
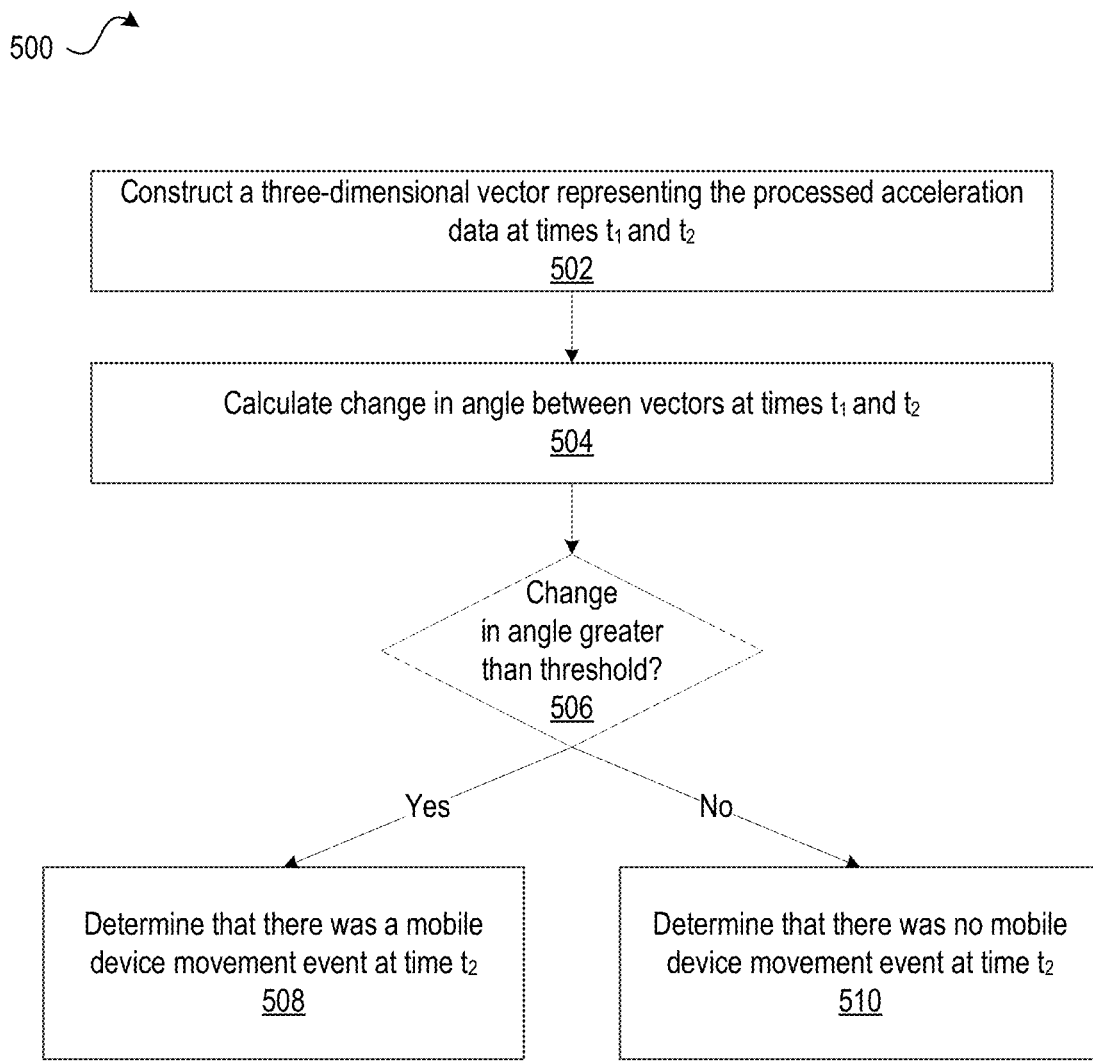
FIG. 5 is a flowchart of example method steps for detecting a mobile device movement event, according to one or more aspects of the disclosure.

Referring now to FIG. 5, a flowchart 500 of example method steps for detecting a mobile device movement event is shown. The movement event detection module 306 of the mobile device movement detection system 202 and/or of the mobile device movement detection unit 230 may be used to perform these method steps. At step 502, the movement event detection module 306 may construct three-dimensional vectors representing the processed acceleration data (signals) at times $t_1$ and $t_2$. In some examples, the acceleration vector at time $t_1$ may be represented as vector a, having an x-axis component $a_x$, a y-axis component $a_y$, and a z-axis component $a_z$. Similarly, the acceleration vector at time $t_2$ may be represented as a vector b, having an x-axis component $b_x$, a y-axis component $b_y$, and a z-axis component $b_z$.

At step 504, the movement event detection module 306 may calculate a change in angle between the vectors at times $t_1$ and $t_2$. In some examples, a formula to calculate a change of angle between vectors may be derived from the formula for calculating the dot product of the vectors a and b. An example of this computation is shown below:

$$a \cdot b = \begin{pmatrix} a_x \\ a_y \\ a_z \end{pmatrix} \cdot \begin{pmatrix} b_x \\ b_y \\ b_z \end{pmatrix} = a_x b_x + a_y b_y + a_z b_z =$$

$$|a||b|\cos \alpha \Longrightarrow \cos \alpha = \frac{a_x b_x + a_y b_y + a_z b_z}{\sqrt{a_x^2 + a_y^2 + a_z^2} \sqrt{b_x^2 + b_y^2 + b_z^2}} \Longrightarrow \alpha =$$

$$\cos^{-1} \frac{a_x b_x + a_y b_y + a_z b_z}{\sqrt{a_x^2 + a_y^2 + a_z^2} \sqrt{b_x^2 + b_y^2 + b_z^2}}$$

In step 506, the movement event detection module 306 may determine whether the change in angle between the vectors a and b is greater than a predetermined threshold (e.g., greater than 0.2°, greater than 0.5°, etc.). Where the change in angle is above predetermined threshold in step 506, the movement event detection module 306 may determine that there was likely a mobile device movement event at time $t_2$ in step 508. Alternatively, where the change in angle is not above the predetermined threshold in step 506, the movement event detection module 306 may determine that there was likely no mobile device movement event at time $t_2$ in step 510.

Referring back to FIG. 4, where the movement event detection module 306 determines that there was likely no mobile device movement event at time $t_2$ in step 410, the movement event detection module 306 may continue collecting acceleration data for new times $t_1$ and $t_2$ in step 418. As such, method steps 402-410 may be repeated using a consecutive window algorithm, such that the consecutive windows are adjacent but not overlapping. As such, in these examples, the mobile device movement detection system 202 advantageously limits and/or controls the number of transmissions between the mobile device 212 and the mobile device movement detection system 202. Further, the mobile device movement detection system 202 advantageously limits and/or controls the aggregation of sensor data.

Figure 6:
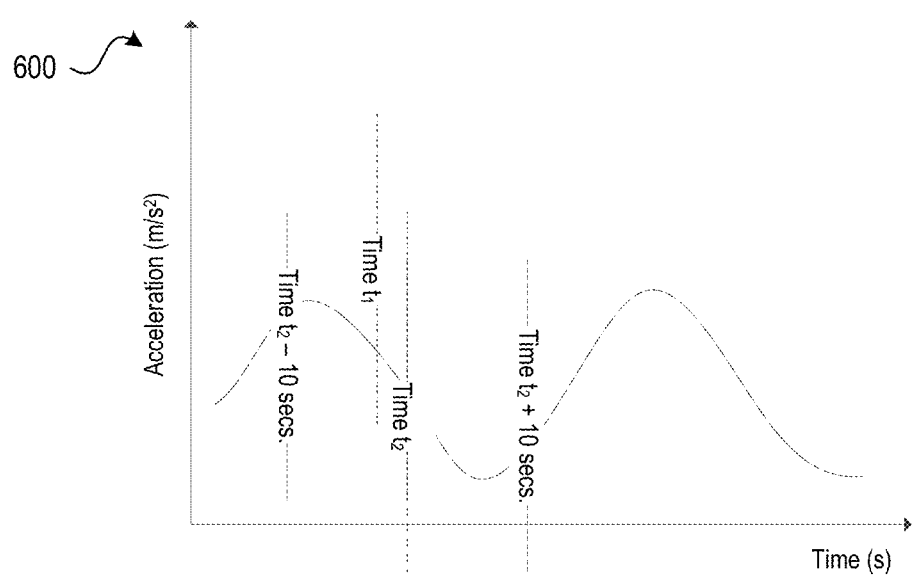
FIG. 6 illustrates a consecutive window approach to detecting mobile device movement events, according to one or more aspects of the disclosure.

Alternatively, where the movement event detection module 306 determines that there was likely a movement device movement event at time $t_2$ in step 410, the sensor data aggregation module 308 may aggregate the sensor data collected in step 404 for a window of time encompassing the mobile device movement event (e.g., encompassing the time $t_2$). As such, the sensor data aggregation module 308 may aggregate sensor data during a window of time starting at a first predetermined duration before the time $t_2$ and ending at a second predetermined duration after the time $t_2$. For instance, the sensor data aggregation module 308 may aggregate sensor data from time $t_2-10$ seconds to $t_2+10$ seconds in step 412, as shown in FIG. 6. As such, the sensor data aggregation module 308 may gather sensor data for a window of time of 21 seconds. It will be appreciated that the window of time used by the sensor data aggregation module 308 may be configured to use varying windows of time, such that a window of time may be greater or lesser than 21 seconds. For example, the sensor data aggregation module 308 may be configured such that the first predetermined duration is longer, shorter, or the same as the second predetermined duration.

In step 414, the risk determination module 310 may calculate a risk score based on the aggregated sensor data. In some examples, the risk score may be based on a plurality of factors, including the speed of the vehicle (e.g., the minimum/maximum speed during the window of time, the average speed during the window of time, etc.), road type (e.g., city street, highway, etc.), weather, time of day, known or unknown route, and phone type (e.g., make and model of mobile device 212). Other factors may be tied to the acceleration data collected from the mobile device 212, such as the intensity of the phone movement as determined by the magnitude of the acceleration vector at time $t_2$. In some examples, the risk determination module 310 may apply factors based on historical determinations by the movement event detection module 306, such as the frequency of mobile device movement events (e.g., average number of mobile device movement events per trip, average number of mobile device events per a predetermined duration of time, etc.).

In some examples, risk determination module 310 may assign a score for each factor. For instance, the risk determination module 310 may be configured such that a higher score is assigned to a maximum speed of the vehicle above a predetermined value during the window of time, whereas a lower score is assigned to a maximum speed of the vehicle above the predetermined value during the window of time. In a further example, the risk determination module 310 may be configured such that a higher score is assigned to driving in rainy or snow weather conditions, whereas a lower score is assigned to driving in dry weather conditions. It will be appreciated that the risk determination module 310 may be similarly configured for other factors utilized to calculate a risk score.

Once each factor is assigned a score, the risk determination module 310 may apply a risk calculation equation to determine the risk score. An example risk calculation equation may be:

$$\text{risk score} = \text{factor}[1].\text{score} + \text{factor}[2].\text{score} + \ldots + \text{factor}[n].\text{score}$$

where factor[1].score . . . factor[n].score are the respective scores assigned to each factor. In some examples, the scores assigned to each factor may be weighted by the risk calculation equation. An example weighted risk calculation equation may be:

$$\text{risk score} = (\text{factor}[1] \cdot \text{score} \times \text{weight}[1]) + (\text{factor}[2] \cdot \text{score} \times \text{weight}[2]) + \ldots + (\text{factor}[n] \cdot \text{score} \times \text{weight}[n])$$

where weight[1] . . . weight[n] are the weights respectively associated with factor[1] . . . factor[n].

It will be appreciated that additional or alternative mathematical operations may be selectively employed to aggregate the scores for each factor. It will also be appreciated that the risk determination module 310 may be configured to apply one or more risk calculation equations that respectively use different factors with different assigned scores and/or weights. For example, the risk determination module 310 may be configured to use one risk calculation equation for a driver associated with a first company, and a second risk calculation equation for a driver associated with a second insurance company.

In step 416, the risk feedback generation module 312 may provide feedback to the mobile device 212 or vehicle 204 based on the calculated risk score. The risk feedback generation module 312 may recommend providing feedback where the calculated risk score is above a predetermined threshold, and/or where particular factors are present. For instance, the risk feedback generation module 312 may generate a notification or warning to advise the driver to stop interaction with the mobile device 212 during weather conditions with low visibility. In another example, the risk feedback generation module 312 may generate a notification or warning to advise the driver to stop interaction with the mobile device 212 while traveling at a speed of above 50 mph.

In other examples, the risk feedback generation module 312 may generate a notification or warning to advise the driver of the most significant factor or factors contributing to a calculated risk score above a predetermined threshold. For example, where the calculated risk score is above the threshold primarily because of the vehicle's speed during the window of time, the risk feedback generation module 312 may generate a notification or warning to decrease the vehicle's speed in order to improve the calculated risk score.

The notification or warning may be, for example, a combination of audio, text, graphics, or other gestures (e.g., vibrations). In some examples, the notification or warning may be communicated to a driver of a vehicle 204 via a dashboard installed or attached to the vehicle. In other examples, the notification or warning may be communicated to the driver of the vehicle via the mobile device 212 or a wearable device. Further, the notification may serve as a disruptive alarm to the driver of the vehicle, or a passive notification. For example, where the mobile device movement event occurs during more dangerous driving conditions (e.g., high speed of the vehicle 204, rainy or snowy weather conditions, low visibility, peak traffic hours, etc.), or if mobile device movement events are frequent (e.g., above a threshold amount of mobile device movement events detected during a trip), the risk feedback generation module 312 may issue an alarm. Alternatively, in these cases, the risk feedback generation module 312 may disable the user interface of the mobile device 212 to prevent further interaction with the mobile device 212. Conversely, where the mobile device movement event occurs during safer driving conditions (e.g., non-peak traffic, high visibility, below average speed of the vehicle, etc.), the risk feedback generation module 312 may issue a more passive notification. For example, the risk feedback generation module 312 may warn the driver via an audio or graphical message on the mobile device 212, and/or through a vibration of a vehicle component in contact with the driver (e.g., the steering wheel, one or more pedals, etc.).

Once the risk feedback determination module 312 has provided the feedback to the mobile device 212 or vehicle 204, the mobile device movement detection system 202 may continue collecting acceleration data for new times for new times $t_1$ and $t_2$, where the new time $t_1$ is after the previous time $t_2$+10 seconds. As such, method steps 402-410 may be repeated using a consecutive window algorithm, such that the consecutive windows are adjacent but not overlapping.

As previously explained, the device may comprise a mobile device, such as a mobile phone. The system may monitor for indications of distracted driving, such as mobile device movement (e.g., orientation changes) within the vehicle and/or mobile device usage within the vehicle. The system may determine instantaneous phone movement and/or usage events and/or continuous phone movement and/or usage events.

Figure 7:
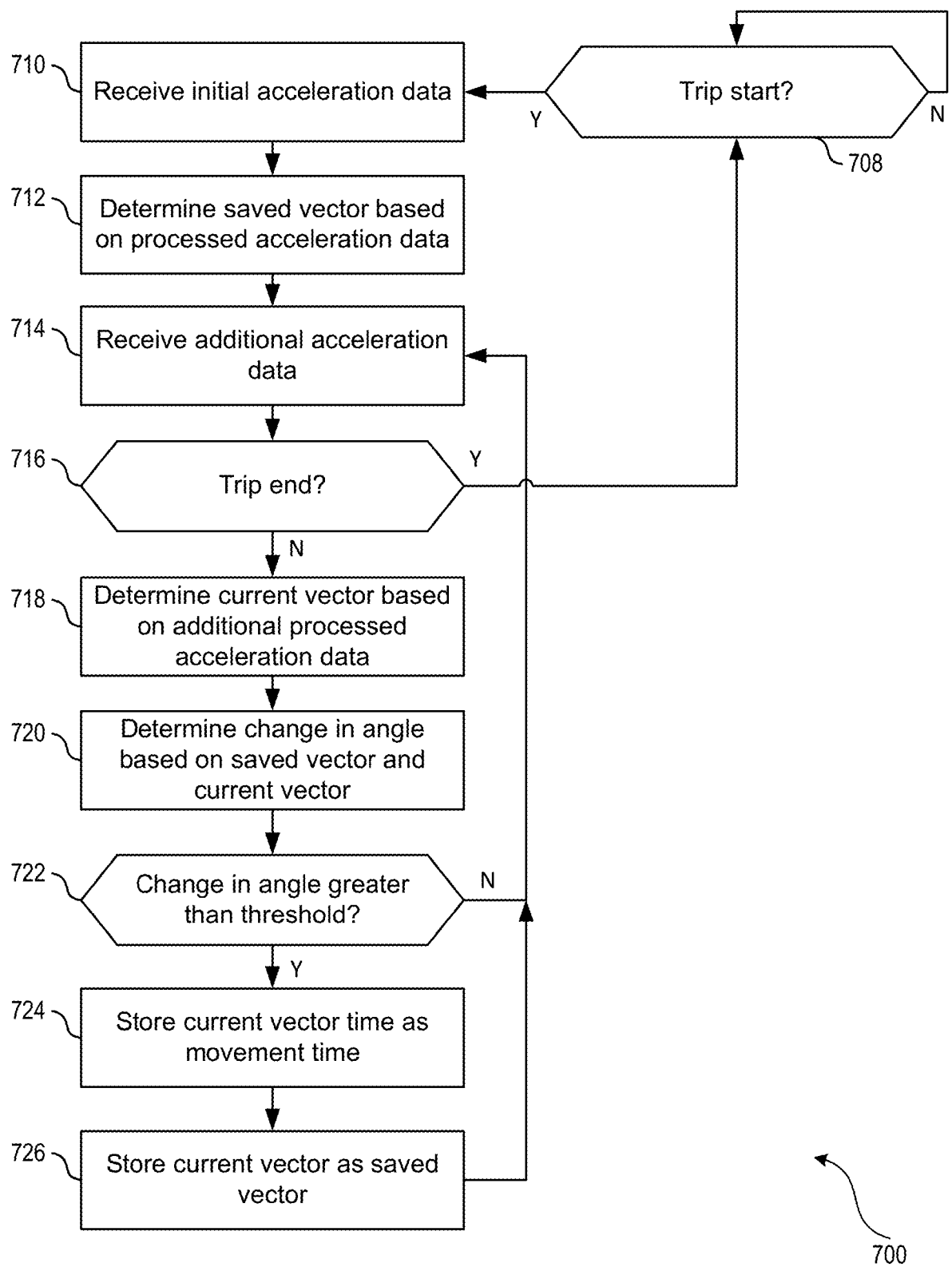
FIG. 7 is a flowchart of example steps for determining device movement, according to one or more aspects described herein.

FIG. 7 is a flowchart 700 of example steps for determining device movement, according to one or more aspects described herein. The various components of the mobile device movement detection system 202 and/or the mobile device movement detection unit 230 of the mobile device 212 may be used to perform one or more of these steps.

In step 708, a device, such as a mobile device, may determine whether a trip associated with the vehicle has started. The device may determine that a trip has started based on a distance the vehicle has traveled from a prior trip end location and/or based on a determination that the vehicle travels over a threshold speed, such as for a threshold amount of time. For example, GPS data may be used to measure the speed of the vehicle. If the vehicle's speed exceeds a threshold speed S, the device may determine that a trip associated with the vehicle has started. Additionally or alternatively, if the vehicle's speed exceeds a threshold speed S for greater than a threshold amount of time T, the device may determine that a trip associated with the vehicle has started. If a trip has not started (step 708: N), the device may wait until it detects a trip starting. If a trip has started (step 708: Y), the device may proceed to step 710.

In step 710, the device may receive initial acceleration data, such as at a first time $t_1$. For example, the device may receive acceleration data from one or more accelerometers and/or a sensor assembly of the device. The device may receive acceleration data at a particular frequency, such as at 1 Hz, 2 Hz, 3 Hz, or any other frequency. The acceleration data may comprise, for example, magnitude and/or direction of the measured acceleration, such as in three axes (e.g., x axis, y axis, and z axis). The acceleration data may also comprise a timestamp (e.g., time $t_1$) corresponding to the measured acceleration. As previously explained, the acceleration data may be processed to remove acceleration due to gravity, and the processed acceleration data may be used to detect movement of the device. The acceleration due to gravity may be represented by a gravity vector. The gravity vector may specify the 1 g (e.g., 9.81 m/s^2) magnitude acceleration that acts in the direction of the center of the earth. The gravity vector may be derived by applying a low-pass filter to accelerometer data, which may be performed in the operating system layer.

In step 712, the device may determine a saved vector based on the initial processed acceleration data. For example, the device may assign the initial processed acceleration as the saved vector, which may comprise a vector representing the processed acceleration along one or more axes (e.g., x axis, y axis, and/or z axis). The saved vector may reflect the device's processed acceleration at a time corresponding to the start of the vehicle's trip. For example, the saved vector may comprise a vector with three values, e.g., (saved.x, saved.y, saved.z). After the trip starts, the device may collect device acceleration data at a particular frequency, such as every 0.5 seconds, 0.7 seconds, second, two seconds, or any other frequency.

The device may collect other sensor data, such as location data, speed data, and/or time data. Location data may be collected from, for example, a GPS sensor (or other location sensor(s)) of the device or the vehicle, as previously explained. In some aspects, location data and/or speed data may be measured at the same frequency or rate as the acceleration data or at a different frequency. For example, location data and/or speed data may be measured at 1 Hz (or any other frequency).

In step 714, the device may receive additional acceleration data, such as at a second time $t_2$ (e.g., 0.7 seconds after the first time $t_1$, one second after the first time $t_1$, etc.). The acceleration data may comprise, for example, magnitude and/or direction of the measured acceleration, such as in three axes (e.g., x axis, y axis, and z axis). The acceleration data may also comprise a corresponding timestamp of time $t_2$. As previously explained, the acceleration data may be processed to remove acceleration due to gravity.

In step 716, the device may determine whether the trip has ended. For example, the device may determine that the trip has ended when the vehicle's speed falls below a threshold speed and the vehicle's speed does not exceed the threshold speed for a threshold amount of time. As previously explained, GPS data may be used to measure the speed of the vehicle, and GPS data may be collected at a particular frequency. If the trip has ended (step 716: Y), the device may return to step 708 and receive and/or process acceleration data for other trips. If the trip has not ended (step 716: N), the device may proceed to step 718.

In step 718, the device may determine a current vector based on the acceleration data (e.g., received and/or processed in step 714). For example, the device may assign the processed acceleration data as the current vector, which may comprise a vector representing the processed acceleration along one or more axes (e.g., x axis, y axis, and/or z axis). The current vector may comprise a vector with three values, e.g., (curr.x, curr.y, curr.z).

In step 720, the device may determine a change in angle based on the saved vector (saved.x, saved.y, saved.z) and the current vector (curr.x, curr.y, curr.z). For example, the change in angle Δθ between the saved vector and the current vector may be computed as follows:

$$\Delta\theta = \arccos\left(\frac{saved \cdot curr}{\|saved\|\|curr\|}\right)$$

where, $saved \cdot curr = saved.x*curr.x + saved.y*curr.y + saved.z*curr.z$ $\|saved\| = \sqrt{saved.x^2 + saved.y^2 + saved.z^2}$ $\|curr\| = \sqrt{curr.x^2 + curr.y^2 + curr.z^2}$ In step 722, the device may determine whether the change in angle between the saved and current vectors (e.g., Δθ) is greater than a threshold angle change. The threshold angle change may comprise any value, such as 17 degrees, 20 degrees, 31 degrees, 38 degrees, 90 degrees, or any other threshold angle. If the angle change is not greater than the threshold angle change (step 722: N), the device may return to step 714 to continue receiving and/or processing additional acceleration data during the trip. If the angle change is greater than the threshold angle change (step 722: Y), the device may determine that a device movement event occurred. The event associated with the current vector (curr.x, curr.y, curr.z) may be recorded as a device movement event, such as a mobile phone movement event. The method may proceed to step 724.

In step 724, the device may store a time corresponding to the current vector (e.g., time $t_2$) as a movement time. The movement time may indicate the time of a detected device movement. Details of the device movement event, such as movement time, change in angle, and/or other acceleration data may be used to determine instantaneous events and/or continuous events, as will be described in further detail with reference to FIG. 9.

In step 726, the device may store the current vector (e.g., indicating the processed acceleration for the device movement event) as the saved vector. For example, the previously saved vector may be replaced by the current vector indicating the device movement event. The method may return to step 714 to receive and/or process additional acceleration data during the trip. As previously explained, the change in angle between acceleration vectors may be calculated at a particular frequency, such as once every second, once every half second, etc. to identify device movement events.

Figure 8:
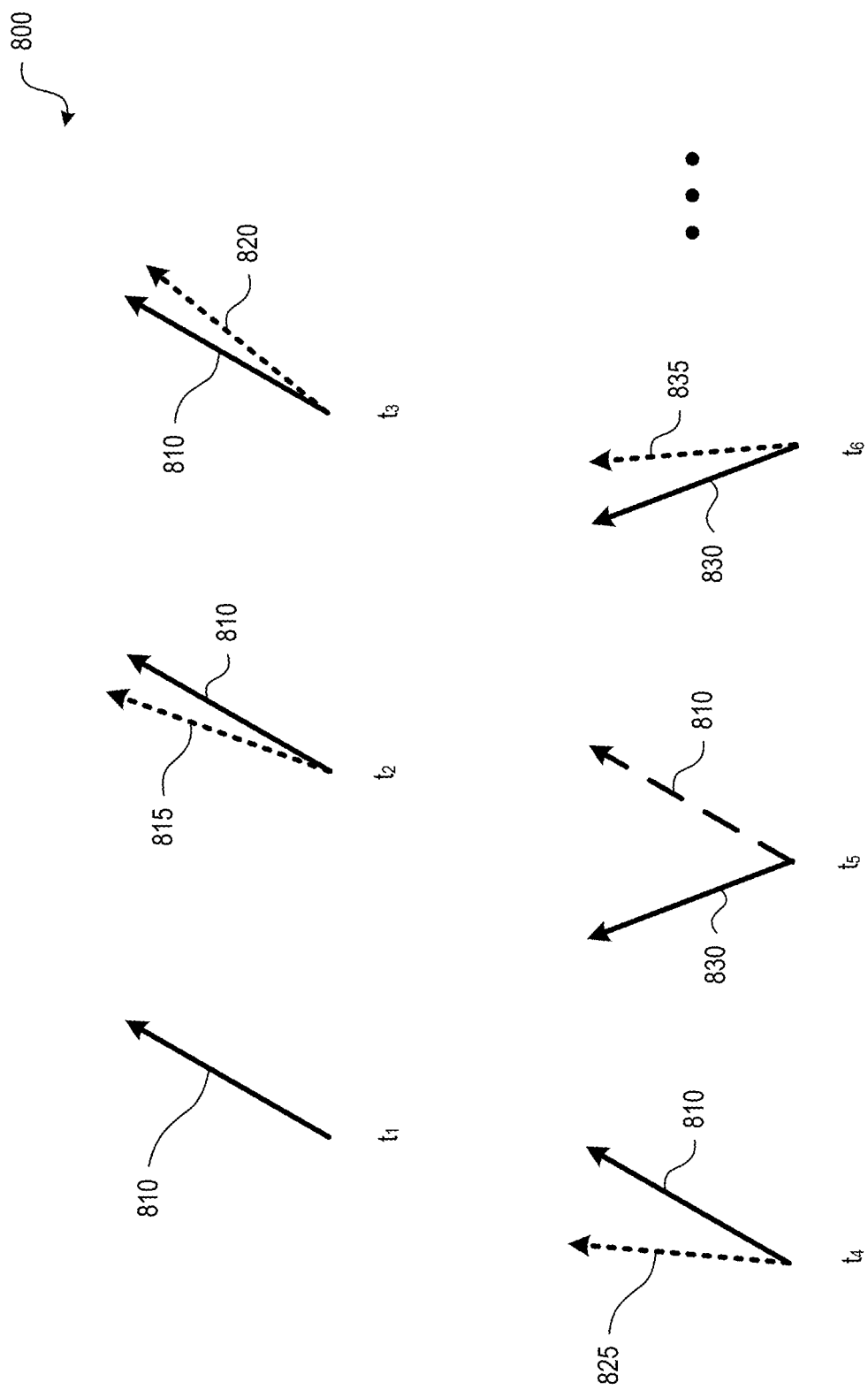
FIG. 8 illustrates an example sequence of vectors used to determine device movement, according to one or more aspects described herein.

FIG. 8 illustrates an example sequence 800 of vectors used to determine device movement, according to one or more aspects described herein. At time $t_1$, a trip start may be triggered (e.g., step 708: Y shown in FIG. 7). The device may receive initial acceleration data (e.g., in step 710) and determine a saved vector 810 based on processed acceleration data (e.g., in step 712). At time $t_2$, the device may receive additional acceleration data (e.g., in step 714). The device may determine a current vector 815 based on processed acceleration data (e.g., in step 718). The device may determine a change in angle between the saved vector 810 and the current vector 815 (e.g., in step 720). The device may determine that the change in angle is not greater than a threshold change in angle (e.g., step 722: N), and may return to step 714 to receive additional acceleration measurements. For example, small deviations from a saved vector might not result in a device movement event, and the saved vector might not be updated. The device may repeat one or more of the above steps for subsequent acceleration measurements. For example, the device may determine that the change in angle between the saved vector 810 and a vector 820 at time $t_3$ is not greater than a threshold change in angle, and might not update the saved vector 810. Similarly, the device may determine that the change in angle between the saved vector 810 and a vector 825 at time $t_4$ is not greater than the threshold change in angle, and might not update the saved vector 810.

At time $t_5$, the device may receive additional acceleration data (e.g., in step 714). The device may determine a current vector 830 based on processed acceleration data (e.g., in step 718). The device may determine a change in angle between the saved vector 810 and the current vector 830 (e.g., in step 720). The device may determine that the change in angle is greater than a threshold change in angle (e.g., step 722: Y), and the device may store the time $t_5$ of the current vector 830 as a movement time indicating movement of the device (e.g., in step 724). The device may also store the current vector 830 as the new saved vector. For example, larger deviations from a saved vector might result in a device movement event, and the saved vector might be updated. An indication of the movement event may be used to determine instantaneous events and/or continuous events, as will be described in further detail below with reference to FIG. 9. The device may continue to evaluate for movement, such as at a time $t_6$ and other times (not shown).

The system may also monitor for other indications of distracted driving. For example, the system may monitor for device usage, such as the user locking the mobile device, unlocking the mobile device, using an application of the mobile device (e.g., a texting application, an email application, a game application, etc.), or otherwise using the mobile device. The mobile device, e.g., via an application, may receive indications of mobile device usage from an operating system of the mobile device. For example, on an ANDROID device, device usage may be recorded each time an ACTION_USER_PRESENT event is recorded from the operating system. On an iOS device, device usage may be recorded each time a data not protected event is recorded from the operating system.

Figure 9:
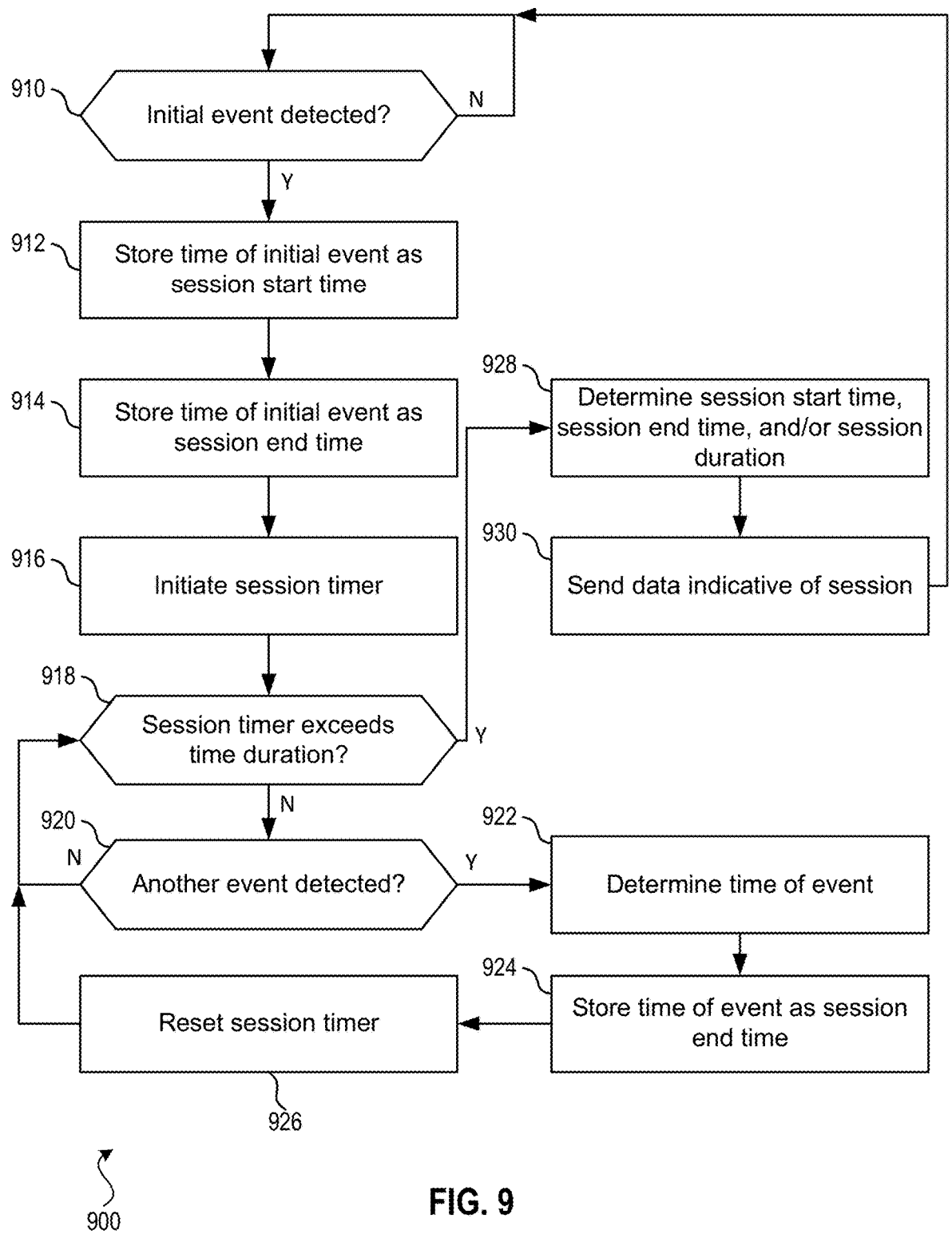
FIG. 9 is a flowchart of example steps for determining instantaneous events and/or continuous events, according to one or more aspects described herein.

FIG. 9 is a flowchart 900 of example steps for determining instantaneous events and/or continuous events, according to one or more aspects described herein. The various components of the mobile device movement detection system 202 and/or the mobile device movement detection unit 230 of the mobile device 212 may be used to perform one or more of these method steps.

In step 910, a device, such as a mobile device, may determine whether an initial event has been detected. The initial event may comprise, for example, a device usage event and/or a device movement event. As previously explained, a device usage event may be detected if, for example, the user locks the device, unlocks the device, uses an application of the device, or otherwise interacts with the device. As previously explained, a device movement event may be detected if the change in angle between two processed acceleration vectors is greater than a threshold angle change. The initial event may indicate the start of a continuous event session or an instantaneous event.

In some examples, an initial event may be detected if a pair of device usage and device movement events is identified. For example, a device usage event and a device movement event may occur at the same time, and the device may determine that the device usage event and the device movement event comprise a pair of events. The device may also or alternatively detect a pair of events if a device usage event and a device movement event occur within a threshold amount of time from each other (e.g., 0.1 seconds, 1 second, or other threshold time). The device may detect an initial event (e.g., step 910: Y) if a pair of usage and device movement events is detected.

Figure 10A:
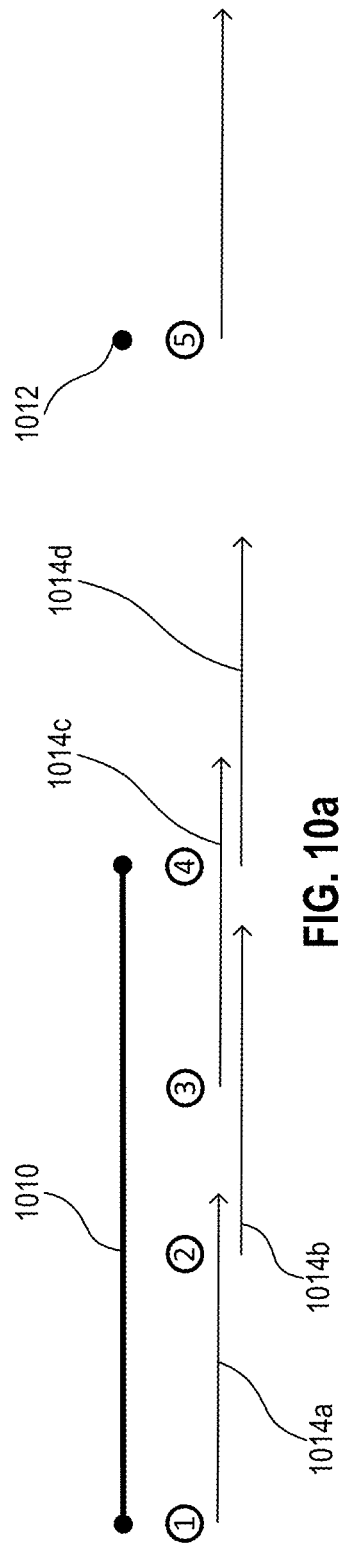
FIGS. 10a-c illustrate example sequences for determining instantaneous events and/or continuous events, according to one or more aspects described herein.
Figure 10B:
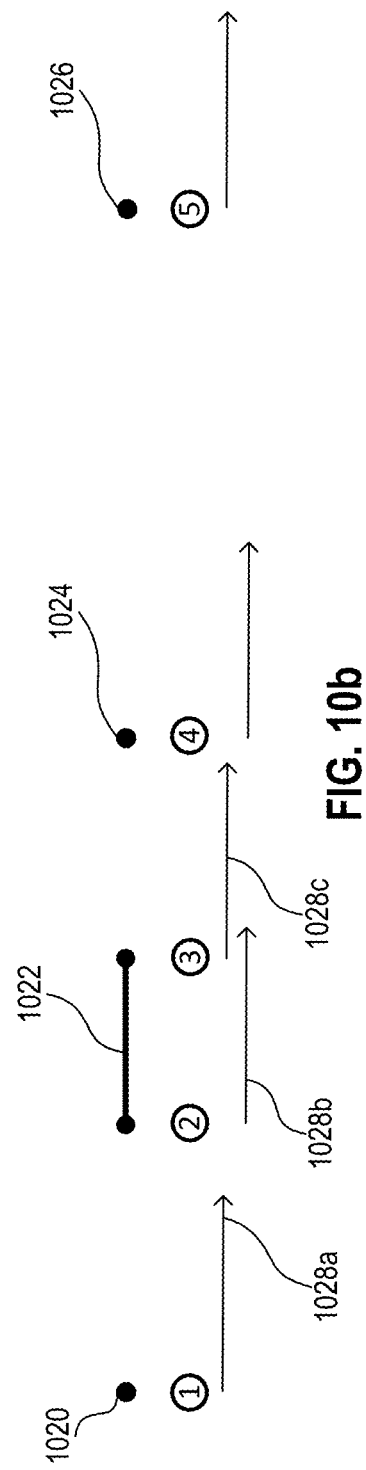
Figure 10C:
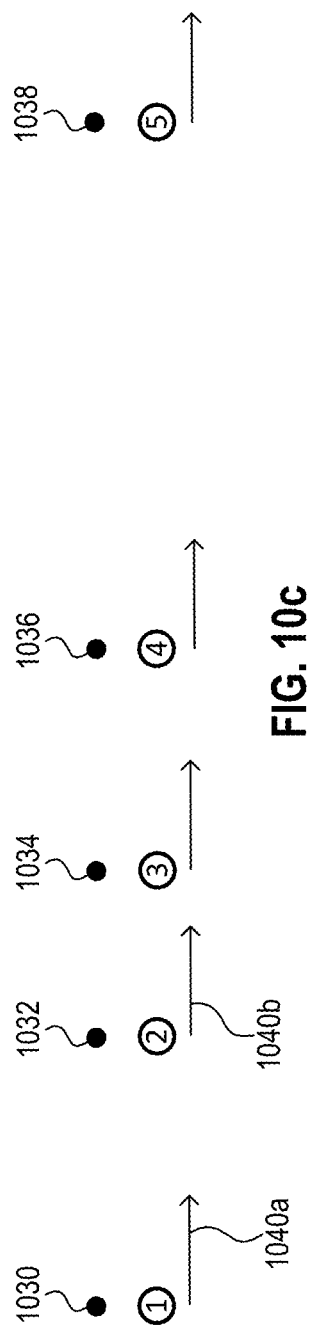

FIGS. 10*a-c* illustrate example sequences for determining instantaneous events and/or continuous events, according to one or more aspects described herein. With reference to FIG. 10*a*, the device may determine that an initial event (e.g., event 1) occurred. Event 1 may comprise an instantaneous event, such as an instantaneous device usage event or an instantaneous device movement event.

Returning to FIG. 9, if the device, in step 910, determines that an initial event has not been detected (step 910: N), the device may continue to monitor whether an initial event has been detected. If the device determines that an initial event has been detected (step 910: Y), the device may proceed to step 912.

In step 912, the device may store the time of the initial event as a start time for a continuous event session. In step 914, the device may also store the time of the initial event as an end time for the continuous event session. Currently, the detected event may be categorized as an instantaneous event because the session start time and the session end time match. As will be described in further detail below, the event may be categorized as a continuous event based on one or more events occurring after the event.

In step 916, the device may initiate a session timer. For example, the session timer may be initiated to 0 seconds. The session timer may be used to determine whether to end the event session or continue the event session. As will be described in further detail below, if the device does not detect another event within a threshold amount of time from the prior event (e.g., the initial event or another event), the device may end the session and determine various parameters for the session (e.g., session start time, session end time, session duration, and the like). If, on the other hand, the device detects another event within a threshold amount of time from the prior event, the device may maintain the session. In these scenarios, the session may comprise a continuous event session, which may comprise a plurality of instantaneous events.

In step 918, the device may determine whether the current time of the session timer exceeds a time duration. With brief reference to FIG. 10*a*, a time duration 1014*a*, for example, may comprise a length of time, such as 10 seconds, 30 seconds, two minutes, 10 minutes, or any other length of time. As will be described in further detail below, if two events occur within the same time duration, the device may determine to combine the two events to form a continuous event. A plurality of time durations (e.g., time duration 1014*a*, time duration 1014*b*, etc.) may be used, and each of the time durations may have the same length of time, such as 30 seconds. The time durations may also have different lengths of time, depending on the event detected. For example, the length of the time duration may depend on the type of event (e.g., a device usage event or a device movement event) triggering the time duration. The time duration for a device usage event may have a particular length of time, and the time duration for a device movement event may have a different length of time. The length of time for the time duration 1014*a* (and/or other time durations, such as time duration 1014*b*, time duration 1028*a*, etc.) may be configured by a user, such as by an agent of an insurance provider or other agent. For example, the length of time may be increased to 40 seconds or decreased to 25 seconds.

Returning to FIG. 9, if the current time of the session timer exceeds the time duration (step 918: Y), the device may proceed to step 928, as will be described in further detail below. Additionally or alternatively, the device may proceed to step 928 if the device determines that the trip has ended. If the current time of the session timer does not exceed the time duration (step 918: N), the device may proceed to step 920.

In step 920, the device may determine whether another event has been detected (e.g., within the time duration). The event may comprise, for example, a device usage event or a device movement event. As previously explained, a device usage event may be detected if, for example, the user locks the device, unlocks the device, uses an application of the device, or otherwise interacts with the device. A device movement event may be detected if, for example, the change in angle between two processed acceleration vectors is greater than a threshold angle change.

With reference to FIG. 10*a*, the device may determine whether another event (e.g., event 2) occurred within the time duration 1014*a*. For example, the time duration 1014*a* may be used to determine whether to combine event 1 (e.g., an initial event, which may have been detected in step 910) and event 2 to form a continuous event or to maintain event 1 and event 2 as separate events. For example, FIG. 10*a* shows event 1 and event 2 occurring within the time duration 1014*a*, and the device may determine to combine event 1 with event 2 to form a continuous event. Returning to FIG. 9, if another event has not been detected (step 920: N), the device may return to step 918 to compare the session timer to the time duration. If, on the other hand, another event has been detected (step 920: Y), the device may proceed to step 922.

In step 922, the device may determine a time of the event (e.g., time of event 2 shown in FIG. 10*a*). In step 924, the device may store the time of the event (e.g., time of event 2) as a session end time. By storing the time of the new event (e.g., time of event 2) as a session end time, the device may overwrite the prior session end time (e.g., time of event 1 stored in step 914).

In step 926, the device may reset the session timer. For example, the session timer may be reset to 0 seconds. By resetting the session timer, a new session timer may be compared to the time duration to determine whether to combine additional events into the continuous event session. The device may return to step 918 to determine whether a session timer exceeds a time duration. If the session timer does not exceed the time duration (step 918: N), the device may proceed to step 920 to determine whether another event has been detected, as previously explained.

With reference to FIG. 10*a*, the device may reset the session timer (e.g., in step 926) after event 2 is detected. The device may determine whether another event has occurred within the time duration 1014*b* (e.g., in step 920). For example, the device may determine that another event (e.g., event 3) occurred within the time duration 1014*b*. After the device detects event 3 occurring within the time duration 1014*b*, the device may determine to combine the three events (e.g., event 1, event 2, and event 3) to form a continuous event. As previously explained, the device may determine the time of event 3 (e.g., in step 922) and store the time of event 3 as the new session end time (e.g., in step 924). The device may also reset the session timer (e.g., in step 926) and continue to monitor for events during a new time duration 1014*c* starting at the time of event 3.

The device may determine that another event (e.g., event 4) occurred within the time duration 1014c. After the device detects event 4 occurring within the time duration 1014c, the device may determine to combine the four events (e.g., event 1, event 2, event 3, and event 4) to form a continuous event. As previously explained, the device may determine the time of event 4 (e.g., in step 922) and store the time of event 4 as the new session end time (e.g., in step 924). The device may also reset the session timer (e.g., in step 926) and continue to monitor for events.

The device may determine whether another event has occurred within the time duration 1014d (e.g., in step 920). Assume that the device does not detect another event occurring within the time duration 1014d. Returning to FIG. 9, in step 918, the device may determine that the current session timer exceeds the time duration 1014d without another event occurring (e.g., step 918: Y). The device may proceed to step 928.

In step 928, the device may determine the session start time, the session end time, and/or the session duration. With reference to FIG. 10a, the device may have previously saved the time of event 1 as the session start time (e.g., in step 912). The device may also have previously saved the time of event 4 as the session end time (e.g., in step 924). The device may determine the session duration 1010 based on the session start time and the session end time (e.g., the difference between the session end time and the session start time).

Returning to FIG. 9, in step 930, the device may send data indicative of the session. For example, the mobile device 212 may send the data to the mobile device movement detection system 202 and/or the insurance system 244. The data may be sent to the mobile device movement detection system 202 and/or the insurance system 244 within a threshold amount of time after the session end time. The mobile device 212 may additionally or alternatively store data, such as locally at the mobile device 212. Data indicative of the session may comprise, for example, the start time of the session, the end time of the session, and/or the session duration. The device may send other data indicative of the session. For example, the data may indicate a location of the device and/or vehicle at the end time of the session (e.g., as a latitude-longitude string). The data may also indicate a location of the device and/or vehicle at the start time of the session. The location(s) may be determined by, for example, a GPS measurement by a GPS sensor of the device or a GPS sensor of the vehicle. The data may indicate a distance driven by the vehicle from the session start time to the session end time, such as a haversine distance (e.g., in miles, kilometers, or other unit of distance measurement). The distance may be determined based on the location of the vehicle at the start time of the session and the location of the vehicle at the end time of the session. The data may also indicate signal strengths of sensor (e.g., GPS) measurements. The data may indicate a speed of the vehicle (e.g., in miles per hour or kilometers per hour) at one or more points in time, such as at a time prior to (but near) the session start time.

The data may indicate an event type associated with the data. The event type may indicate whether the session is based on device movement events, based on device usage events, or based on a combination of device movement and device usage events. The event type may also indicate whether the time duration(s) used to determine the session was configured by a user (e.g., a customer). After a session (e.g., an instantaneous or continuous session) ends and/or data is sent back, the device may begin monitoring for other sessions. For example, the device may return to step 910 to wait for another initial event.

FIG. 10b illustrates another example sequence for determining instantaneous events and/or continuous events, according to one or more aspects described herein. The time durations used in the example sequence shown in FIG. 10b may be shorter than the time durations used in the example sequence shown in FIG. 10a. The device may detect an event 1 (e.g., in step 910 shown in FIG. 9). As previously explained, the event detected by the device may comprise a device usage event (e.g., device unlock, device lock, application usage, etc.) and/or a device movement event (e.g., a change in vector angles exceeding a threshold change in angle). The device may store the time of event 1 as a session start time (e.g., in step 912) and also store the time of event 1 as the session end time (e.g., in step 914). The device may initiate a session timer (e.g., in step 916). As shown in FIG. 10b, the device might not detect another event during the time duration 1028a. In this example, the device may determine that event 1 comprises an instantaneous event 1020 (e.g., in step 928) and not, for example, a continuous event. The device may continue to monitor for other events during the trip or during other trips (e.g., in step 910). For example, assume that the device detects the event 2 shown in FIG. 10b. The device may detect another event, such as event 3, occurring within the time duration 1028b (e.g., in step 920 shown in FIG. 9). The device may combine event 2 and event 3 to form a continuous event. The device may continue to monitor for other events, such as during time duration 1028c. If the device does not detect another event during the time duration 1028c, the device may determine that events 1 and 2 comprise a continuous event 1022 spanning from the time of event 2 to the time of event 3 (e.g., in step 928). The device may determine another instantaneous event 1024 corresponding to event 4, another instantaneous event 1026 corresponding to event 5, and other instantaneous or continuous events during a trip.

FIG. 10c illustrates another example sequence for determining instantaneous events and/or continuous events, according to one or more aspects described herein. The time durations used in the example sequence shown in FIG. 10c may be shorter than the time durations used in the example sequence shown in FIG. 10b. The device may monitor for events (e.g., in step 910). The device may detect an event 1. The device might not detect another event during a time duration 1040a. In this example, the device may determine that event 1 comprises an instantaneous event 1030 (e.g., in step 928) and not, for example, a continuous event. The device may continue to monitor for other events. For example, the device may detect an event 2. The device might not detect another event during a time duration 1040b. In this example, the device may determine that event 2 also comprises an instantaneous event 1032 and not, for example, a continuous event. The device may similarly determine an instantaneous event 1034 corresponding to event 3, an instantaneous event 1036 corresponding to event 4, an instantaneous event 1038 corresponding to event 5, or other instantaneous our continuous events.

As previously explained, one or more of the steps illustrated in FIG. 9 may be used to determine instantaneous or continuous events that combine mobile device movement events with mobile device usage events. However, one or more of the steps illustrated in FIG. 9 may similarly be used to determine instantaneous or continuous mobile device usage events alone or to determine instantaneous or continuous mobile device movement events alone.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A mobile device comprising:
an accelerometer configured to measure acceleration of at least one axis of the accelerometer;
a processor; and
memory storing computer-executable instructions that, when executed by the processor, cause the processor of the mobile device to:
receive, from the accelerometer, acceleration data measured by the accelerometer;
detect, based on the acceleration data measured by the accelerometer, a mobile device movement event associated with the mobile device;
based on the detection of the mobile device movement event, store a time associated with the mobile device movement event;
determine whether an event associated with the mobile device occurs within a threshold amount of time from the time associated with the mobile device movement event;
based on the determination of whether the event associated with the mobile device occurs within the threshold amount of time from the time associated with the mobile device movement event, determine an event session associated with the mobile device, wherein a start time of the event session comprises the time associated with the mobile device movement event; and
transmit, to a server, data indicative of the event session.

2. The mobile device of claim 1, wherein receiving the acceleration data comprises receiving first acceleration data measured by the accelerometer at a first time and second acceleration data measured by the accelerometer at a second time, and wherein detecting the mobile device movement event comprises:
determining a difference in angle between a first three-dimensional vector corresponding to the first acceleration data and a second three-dimensional vector corresponding to the second acceleration data; and
determining that the difference in angle is greater than a threshold angle.

3. The mobile device of claim 1, wherein the memory stores computer-executable instructions that, when executed by the processor, cause the processor of the mobile device to:
determine that the event associated with the mobile device occurs within the threshold amount of time from the time associated with the mobile device movement event,
wherein determining the event session associated with the mobile device comprises determining a continuous event session associated with the mobile device, wherein an end time of the continuous event session comprises a time associated with the event or a time associated with a different event occurring after the event.

4. The mobile device of claim 1, wherein the event associated with the mobile device comprises a second mobile device movement event associated with the mobile device, and wherein the memory stores computer-executable instructions that, when executed by the processor, cause the processor of the mobile device to:
determine that the second mobile device movement event associated with the mobile device occurs within the threshold amount of time from the time associated with the mobile device movement event.

5. The mobile device of claim 1, wherein the event associated with the mobile device comprises a mobile device usage event associated with the mobile device, and wherein the memory stores computer-executable instructions that, when executed by the processor, cause the processor of the mobile device to:
determine that the mobile device usage event associated with the mobile device occurs within the threshold amount of time from the time associated with the mobile device movement event.

6. The mobile device of claim 5, wherein the mobile device usage event comprises a mobile device unlock or a mobile device lock.

7. The mobile device of claim 1, wherein determining whether the event associated with the mobile device occurs within the threshold amount of time comprises determining that each event, of a plurality of events associated with the mobile device, occurs within a respective threshold amount of time from a prior event, wherein determining the event session associated with the mobile device comprises determining a continuous event session associated with the mobile device, and wherein an end time of the continuous event session comprises a time associated with a last event of the plurality of events.

8. The mobile device of claim 1, wherein determining the event session associated with the mobile device comprises determining the start time of the event session, an end time of the event session, and a duration of the event session, and wherein transmitting the data indicative of the event session comprises transmitting data indicative of the start time of the event session, the end time of the event session, and the duration of the event session.

9. A method comprising:
receiving, by a mobile device and from an accelerometer configured to measure acceleration of at least one axis of the accelerometer, acceleration data measured by the accelerometer;
detecting, by the mobile device and based on the acceleration data measured by the accelerometer, a mobile device movement event associated with the mobile device;
based on the detecting the mobile device movement event, storing a time associated with the mobile device movement event;
determining whether an event associated with the mobile device occurs within a threshold amount of time from the time associated with the mobile device movement event;
based on the determining whether the event associated with the mobile device occurs within the threshold amount of time from the time associated with the mobile device movement event, determining an event session associated with the mobile device, wherein a start time of the event session comprises the time associated with the mobile device movement event; and
transmitting, by the mobile device and to a server, data indicative of the event session.

10. The method of claim 9, wherein receiving the acceleration data comprises receiving first acceleration data measured by the accelerometer at a first time and second acceleration data measured by the accelerometer at a second time, and wherein detecting the mobile device movement event comprises:
  determining a difference in angle between a first three-dimensional vector corresponding to the first acceleration data and a second three-dimensional vector corresponding to the second acceleration data; and
  determining that the difference in angle is greater than a threshold angle.

11. The method of claim 9, further comprising:
  determining that the event associated with the mobile device occurs within the threshold amount of time from the time associated with the mobile device movement event,
  wherein determining the event session associated with the mobile device comprises determining a continuous event session associated with the mobile device, wherein an end time of the continuous event session comprises a time associated with the event or a time associated with a different event occurring after the event.

12. The method of claim 9, wherein the event associated with the mobile device comprises a second mobile device movement event associated with the mobile device, the method further comprising:
  determining that the second mobile device movement event associated with the mobile device occurs within the threshold amount of time from the time associated with the mobile device movement event.

13. The method of claim 9, wherein the event associated with the mobile device comprises a mobile device usage event associated with the mobile device, the method further comprising:
  determining that the mobile device usage event associated with the mobile device occurs within the threshold amount of time from the time associated with the mobile device movement event.

14. The method of claim 13, wherein the mobile device usage event comprises a mobile device unlock or a mobile device lock.

15. The method of claim 9, wherein determining whether the event associated with the mobile device occurs within the threshold amount of time comprises determining that each event, of a plurality of events associated with the mobile device, occurs within a respective threshold amount of time from a prior event, wherein determining the event session associated with the mobile device comprises determining a continuous event session associated with the mobile device, and wherein an end time of the continuous event session comprises a time associated with a last event of the plurality of events.

16. The method of claim 9, wherein determining the event session associated with the mobile device comprises determining the start time of the event session, an end time of the event session, and a duration of the event session, and wherein transmitting the data indicative of the event session comprises transmitting data indicative of the start time of the event session, the end time of the event session, and the duration of the event session.

17. A non-transitory computer readable medium storing instructions that, when read by a processor of a mobile device, cause the processor of the mobile device to:
  detect a mobile device usage event associated with the mobile device;
  based on the detection of the mobile device usage event, store a time associated with the mobile device usage event;
  determine whether an event associated with the mobile device occurs within a threshold amount of time from the time associated with the mobile device usage event;
  based on the determination of whether the event associated with the mobile device occurs within the threshold amount of time from the time associated with the mobile device usage event, determine an event session associated with the mobile device, wherein a start time of the event session comprises the time associated with the mobile device usage event; and
  transmit, to a server, data indicative of the event session.

18. The non-transitory computer readable medium of claim 17, wherein the instructions that, when read by the processor of the mobile device, cause the processor of the mobile device to:
  receive, from an accelerometer configured to measure acceleration of at least one axis of the accelerometer, first acceleration data measured by the accelerometer at a first time and second acceleration data measured by the accelerometer at a second time;
  determine a difference in angle between a first three-dimensional vector corresponding to the first acceleration data and a second three-dimensional vector corresponding to the second acceleration data; and
  determine that the difference in angle is greater than a threshold angle,
  wherein determining whether the event associated with the mobile device occurs within the threshold amount of time from the time associated with the mobile device usage event comprises determining, based on the determination that the difference in angle is greater than the threshold angle, that a mobile device movement event associated with the mobile device occurs within the threshold amount of time from the time associated with the mobile device usage event.

19. The non-transitory computer readable medium of claim 17, wherein the event associated with the mobile device comprises a mobile device movement event associated with the mobile device, and wherein the instructions that, when read by the processor of the mobile device, cause the processor of the mobile device to:
  determine that the mobile device movement event associated with the mobile device occurs within the threshold amount of time from the time associated with the mobile device usage event.

20. The non-transitory computer readable medium of claim 17, wherein the event associated with the mobile device comprises a second mobile device usage event associated with the mobile device, and wherein the instructions that, when read by the processor of the mobile device, cause the processor of the mobile device to:
  determine that the second mobile device usage event associated with the mobile device occurs within the threshold amount of time from the time associated with the mobile device usage event.

* * * * *

UNITED STATES PATENT AND TRADEMARK OFFICE
CERTIFICATE OF CORRECTION

| | | |
|---|---|---|
| PATENT NO. | : 10,567,919 B2 | Page 1 of 1 |
| APPLICATION NO. | : 15/935161 | |
| DATED | : February 18, 2020 | |
| INVENTOR(S) | : Schmitt et al. | |

It is certified that error appears in the above-identified patent and that said Letters Patent is hereby corrected as shown below:

On the Title Page

Column 1, (71) Applicant, Lines 1-2:
Delete "Allstate Insurance Company, Northbrook, IL (US)" and insert --Arity International Limited, Belfast (IE)--

In the Specification

Column 7, Detailed Description, Line 17:
Delete "devices" and insert --system--

Column 9, Detailed Description, Line 6:
Delete "112" and insert --212--

Column 9, Detailed Description, Line 7:
Delete "112." and insert --212.--

Column 19, Detailed Description, Line 27:
Delete "determination" and insert --generation--

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*